(12) United States Patent
Lee et al.

(10) Patent No.: US 11,325,869 B1
(45) Date of Patent: May 10, 2022

(54) ENVIRONMENTAL BARRIER COATINGS FOR IMPROVED TEMPERATURE CAPABILITIES AND LONGEVITY

(71) Applicant: United States of America as represented by the Administrator of NASA, Washington, DC (US)

(72) Inventors: Kang N. Lee, Westlake, OH (US); Deborah L. Waters, Brunswick, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 652 days.

(21) Appl. No.: 16/166,606

(22) Filed: Oct. 22, 2018

Related U.S. Application Data

(60) Provisional application No. 62/574,830, filed on Oct. 20, 2017, provisional application No. 62/574,824, filed on Oct. 20, 2017, provisional application No. 62/574,825, filed on Oct. 20, 2017.

(51) Int. Cl.

| | | |
|---|---|---|
| C04B 41/52 | (2006.01) | |
| C04B 41/00 | (2006.01) | |
| C04B 41/85 | (2006.01) | |
| C04B 41/45 | (2006.01) | |
| C04B 41/89 | (2006.01) | |
| C04B 41/46 | (2006.01) | |
| C04B 41/50 | (2006.01) | |

(52) U.S. Cl.
CPC ............ *C04B 41/52* (2013.01); *C04B 41/009* (2013.01); *C04B 41/4543* (2013.01); *C04B 41/463* (2013.01); *C04B 41/5024* (2013.01); *C04B 41/85* (2013.01); *C04B 41/89* (2013.01); *C04B 41/5042* (2013.01); *C04B 41/5045* (2013.01)

(58) Field of Classification Search
None
See application file for complete search history.

(56) References Cited

U.S. PATENT DOCUMENTS

| | | | | |
|---|---|---|---|---|
| 2004/0062954 | A1* | 4/2004 | Wang | F28F 19/02 428/701 |
| 2010/0183877 | A1* | 7/2010 | Ishibashi | B01J 21/10 428/402 |
| 2011/0027476 | A1* | 2/2011 | Kirby | C04B 41/89 427/193 |
| 2012/0190541 | A1* | 7/2012 | Koranne | B01J 37/0221 502/439 |
| 2014/0261080 | A1* | 9/2014 | Lee | C23C 14/08 106/286.5 |

* cited by examiner

Primary Examiner — Francisco W Tschen
(74) Attorney, Agent, or Firm — Robert H. Earp, III; Mark Wolfgang; Helen M. Gaius

(57) ABSTRACT

Slurry EBC systems and method for fabricating slurry EBC systems for protecting component substrates and extending the longevity of such components are disclosed. The slurry EBC systems include a bond coat having a temperature capability of up to 1482° C. (2700° F.). Example bond coats include a mullite-based bond coat and a rare earth disilicate-based bond coat.

18 Claims, 20 Drawing Sheets

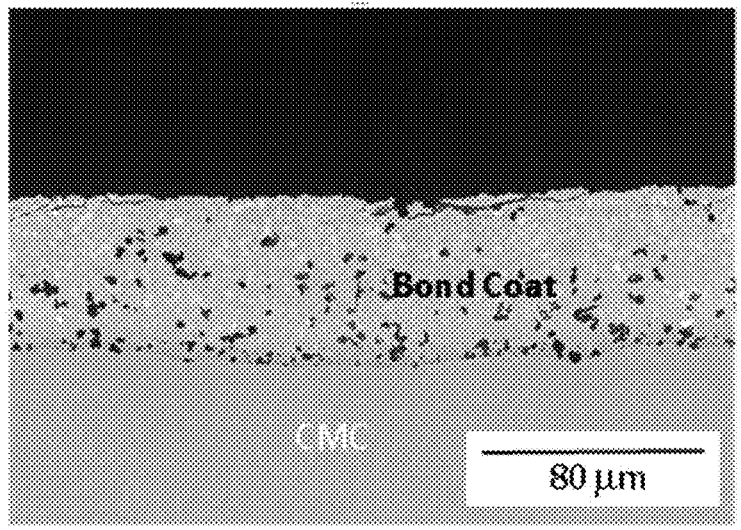
FIG. 1
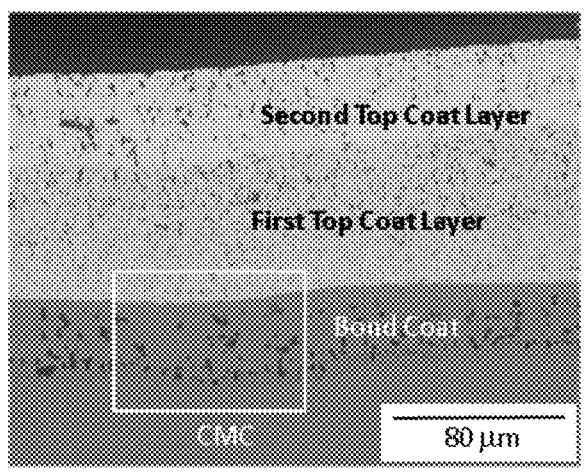 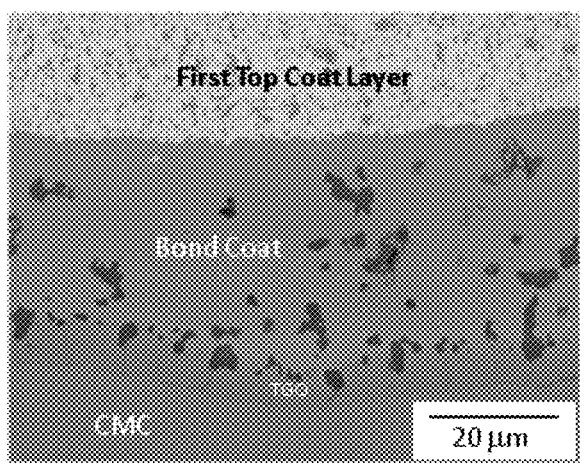
FIG. 2A                                    FIG. 2B

ENVIRONMENTAL BARRIER COATINGS FOR IMPROVED TEMPERATURE CAPABILITIES AND LONGEVITY

CROSS-REFERENCE TO RELATED APPLICATIONS

This application claims the benefit of U.S. Provisional Patent Application Ser. No. 62/574,830 entitled "Slurry Environmental Barrier Coatings with Mullite-Based Bond Coat" filed on Oct. 20, 2017, U.S. Provisional Patent Application Ser. No. 62/574,825 entitled "Slurry Environmental Barrier Coatings with Rare Earth Disilicate-Based Bond Coat" filed on Oct. 20, 2017, and U.S. Provisional Application Ser. No. 62/574,824 entitled "Alloyed Rare Earth Silicate Environmental Barrier Coating" filed on Oct. 20, 2017, each of which is is incorporated by reference in its entirety herein.

ORIGIN OF THE INVENTION

The invention described herein was made by employees of the United States Government and may be manufactured and used only by or for the Government for Government purposes without the payment of any royalties thereon or therefore.

TECHNICAL FIELD

The innovation relates to slurry environmental barrier coatings with a bond coat that is mullite-based or rare earth disilicate based and methods for making and using the same.

BACKGROUND

Environmental barrier coating (EBC) systems are used to protect monolithic ceramic or ceramic matrix composite (CMC) components from high temperature, water vapor and/or other corrosive combustion gas attacks in gas turbine or other heat engines, and are resistant to thermal cycling and mechanical fatigue operating conditions. SiC/SiC CMCs are particularly useful for advanced gas turbines because of their light weight, higher temperature capability, and oxidation resistance. Limitations of SiC/SiC CMCs include surface recession due to reaction with water vapor. The solutions to improve the life of CMCs by protecting them from water vapor include the incorporation of EBC systems. The EBC system typically comprises at least two layers, e.g., a bond coat and a top coat. Generally, the bond coat layer of the EBC is in contact with the CMC substrate and the top coat is the layer of EBC that is in contact with the environment.

Typically, the bond coat provides bonding between the CMC and EBC and also functions to provide oxidation resistance from the environment, while the primary functions of the top coat include providing protection from water vapor recession and other corrosive species from the environment including CMAS (calcium-magnesium-aluminosilicate).

Failure of the EBC means rapid reduction in component life. This leads to a shifting of the role of coatings away from secondary reliance (i.e., the coating extending the life of the component and when the coating is lost or fails there is still an appreciable remnant life of the component) to prime reliance, where the failure of the coating would result in a rapid failure of the component. The most likely EBC failure mode, identified in laboratory tests and confirmed in engine tests, is oxidation of the bond coat by water vapor (steam oxidation). EBC technology to significantly improve EBC steam oxidation life is needed.

The current $Si/Yb_2Si_2O_7$ EBC fails at ~500 h at 2400° F. steam cycling in 90% $H_2O$, which is well short of >10,000 h life goal of CMC components. As the need for CMCs that can withstand higher temperatures increases, the need for a new class of EBCs with the capability to withstand these higher temperatures and other stresses also increases.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation provides EBC systems for protecting component substrates and extending the longevity of such components. According to an aspect, the innovation provides a slurry EBC that can be applied to a substrate (e.g., a CMC substrate), wherein the bond coat has a temperature capability of up to 1482° C. (2700° F.).

According to an embodiment, the innovation provides a method of fabricating a slurry environmental barrier coating system comprising fabricating a mullite-based bond coat and a top coat comprising a HfSiO4-based first top coat layer and a RE2Si2O7-based second top coat layer.

The bond coat may be fabricated by preparing a mixture of a coating material, a primary sintering aid, at least one secondary sintering aid, and a solvent. In one embodiment, the coating material comprises 70 wt %-99 wt % mullite and the primary sintering aid comprises 1-30 wt % Si. The at least one secondary sintering aid may be selected from 0.1 wt % to 20 wt % $RE_2Si_2O_7$, 0.1 wt % to 20 wt % $Y_2Si_2O_7$, 0.1 wt % to 20 wt % YAG ($Y_3Al_5O_{12}$), 0.1 wt % to 20 wt % YbAG ($Yb_3Al_5O_{12}$), 0.1 wt % to 20 wt % $Al_2O_3$, and 0.1 wt % to 20 wt % $TiO_2$, or any combination of two or more thereof. In one embodiment, the secondary sintering aid is $Yb_2Si_2O_7$. The mixture may then be processed to form a slurry. In one embodiment, the mixture may be milled in a milling media to form a slurry.

The first slurry may then be filtered and dried to form a powder of the coating material, the primary sintering aid, and the at least one secondary sintering aid. The powder may then be mixed with a solution comprising a second solvent (e.g., an alcohol) and organic processing aids (e.g., a dispersant and a binder). The resulting slurry mixture is milled to form the bond coat layer. The bond coat layer can be applied to a SiC/SiC ceramic matrix composite.

The top coat may be fabricated in a similar manner. In one embodiment, the first top coat layer may comprise a coating material comprising 80 wt %-99 wt % $HfSiO_4$, a primary sintering aid comprising 1 wt % to 20 wt % Si, and a first solvent. It may also include an optional secondary sintering aid selected from 0.1 to 20 wt % mullite, 0.1 wt % to 20 wt % YAG ($Y_3Al_5O_{12}$), 0.1 wt % to 20 wt % YbAG ($Yb_3Al_5O_{12}$), 0.1 to 20 wt % $Yb_2Si_2O_7$, 0.1 wt % to 20 wt % $Y_2Si_2O_7$, 0.1 wt % to 20 wt % $Al_2O_3$, and 0.1 wt % to 20 wt % $TiO_2$, or any combination of two or more thereof.

The second top coat may comprise a coating material comprising 70 wt %-99.9 wt % RE2Si2O7, a primary sintering aid comprising 0.1 wt % to 10 wt % mullite, and a solvent. It may also include an optional secondary sintering aid selected from 0.1 wt % to 20 wt % YAG (Y3Al5O12), 0.1 wt % to 20 wt % YbAG (Yb3Al5O12), 0.1 wt % to 20 wt % Al2O3, and 0.1 wt % to 20 wt % TiO2, or any combination of two or more thereof.

In one embodiment, the EBC fabrication may further include fabricating optional outer top coat layers comprising $RE_2SiO_5$, $RE_2O_3$, or stabilized $ZrO_2$ and/or stabilized $HfO_2$, wherein the outer top coat layer is applied to the second top coat layer. In one embodiment, the EBC fabrication may include fabrication of a first outer top coat layer comprising $RE_2SiO_5$ applied to the second top coat layer. In another embodiment, a second outer top coat layer comprising $RE_2O_3$ may be fabricated and applied to the first outer top coat layer.

Application of any of the layers (e.g., the bond coat layer or any of the top coat layers) may be done by dipping, spinning, spin-dipping, painting, or spraying.

Each of the layers may also be further processed by drying, binder burn-out, and sintering. This additional processing may be done after application of each layer or may be done after application of the final layer.

In one embodiment, the innovation provides a slurry environmental barrier coating system comprising a mullite-based bond coat and a top coat comprising a first top coat and a second top coat fabricated according to the method described above and applied to a surface of a ceramic matrix composite.

In yet another embodiment, the innovation provides a method for fabricating slurry environmental barrier coating system comprising a rare earth disilicate-based bond coat. The slurry EBC further comprises a top coat. The method of fabricating the layers is similar to the method described above.

According to this embodiment, the bond coat may comprise 70 wt %-99 wt % $RE_2Si_2O_7$, a primary sintering aid comprising 1 wt % to 30 wt % Si, at least one secondary sintering aid, and a first solvent. The at least one secondary sintering aid may be selected from 0.1 to 20 wt % mullite, 0.1 wt % to 20 wt % YAG ($Y_3Al_5O_{12}$), 0.1 wt % to 20 wt % YbAG ($Yb_3Al_5O_{12}$), 0.1 wt % to 20 wt % $Al_2O_3$, and 0.1 wt % to 20 wt % $TiO_2$, or any combination of two or more thereof.

The top coat may comprise 70 wt %-99.9 wt % $RE_2Si_2O_7$, a primary sintering aid comprising 0.1 wt % to 10 wt % mullite, and a first solvent. It may also include an optional secondary sintering aid selected from 0.1 wt % to 20 wt % YAG ($Y_3Al_5O_{12}$), 0.1 wt % to 20 wt % YbAG ($Yb_3Al_5O_{12}$), 0.1 wt % to 20 wt % $Al_2O_3$, and 0.1 wt % to 20 wt % $TiO_2$, or any combination of two or more thereof.

This embodiment may also include one or more outer top coat layers comprising $RE_2SiO_5$, $RE_2O_3$, or stabilized $ZrO_2$ and/or stabilized $HfO_2$, wherein the outer top coat layer is applied to the top coat layer. In one embodiment, the EBC fabrication may include fabrication of a first outer top coat layer comprising $RE_2SiO_5$ applied to the top coat layer. In another embodiment, a second outer top coat layer comprising $RE_2O_3$ may be fabricated and applied to the first outer top coat layer.

Application of any of the layers (e.g., the bond coat layer, the top coat layer, or any of the outer top coat layers) may be done by dipping, spinning, spin-dipping, painting, or spraying.

Each of the layers may also be further processed by drying, binder burn-out, and sintering. This additional processing may be done after application of each layer or may be done after application of the final layer.

In one embodiment, the innovation provides a slurry environmental barrier coating system comprising a rare earth disilicate-based bond coat and a top coat fabricated according to the method described above and applied to a surface of a ceramic matrix composite.

BRIEF DESCRIPTION OF THE DRAWINGS

FIG. 1 is an image showing the cross-section of a slurry EBC system comprising a substrate CMC and a mullite-based bond coat comprising mullite+7 $Al_2O_3$+1.3 $Yb_2Si_2O_7$+10 Si (wt %) sintered at 1525° C. for 3 hours.

FIGS. 2A and 2B are low magnification (FIG. 2A) and high magnification (FIG. 2B) images of a cross-section of EBC with a bond coat comprising mullite+7 $Al_2O_3$+1.3 $Yb_2Si_2O_7$+10 Si (wt %), a first top coat layer comprising an $HfSiO_4$+5 Si (wt %) chemical barrier, and $Yb_2Si_2O_7$+0.2 mullite (wt %) second top coat layer sintered at 1525° C. for 3 hours followed by 100 h/100 cycle steam cycling at 2600° F. in 90% $H_2O$-balance $O_2$. The cycle frequency was 1 hr at 2600° F. and 20 min at T<100° C.

FIG. 8B is a higher magnification image of the indicated portion of the EBC of FIG. 8A and depicts the TGO layer between the Si bond coat and the $Yb_2Si_2O_7$ top coat.

FIG. 9B is a higher magnification image of the indicated portion of the EBC of FIG. 9A. The cycle frequency is 1 hr at 2400° F. and 20 min at T<100° C.

DETAILED DESCRIPTION

Figure 3A:
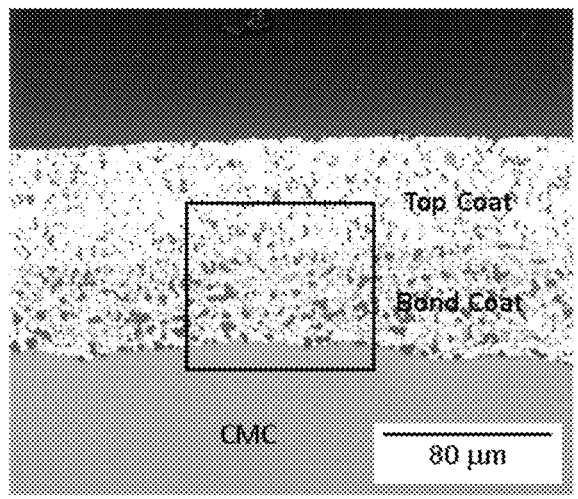
FIGS. 3A and 3B are low magnification (FIG. 3A) and high magnification (FIG. 3B) images showing a cross-section of an EBC according to an embodiment of the innovation with a $Yb_2Si_2O_7$+1.0 mullite+10 Si (wt %) bond coat and a $Yb_2Si_2O_7$+0.2 mullite (wt %) top coat sintered at 1525° C. for 3 hours.
Figure 3B:
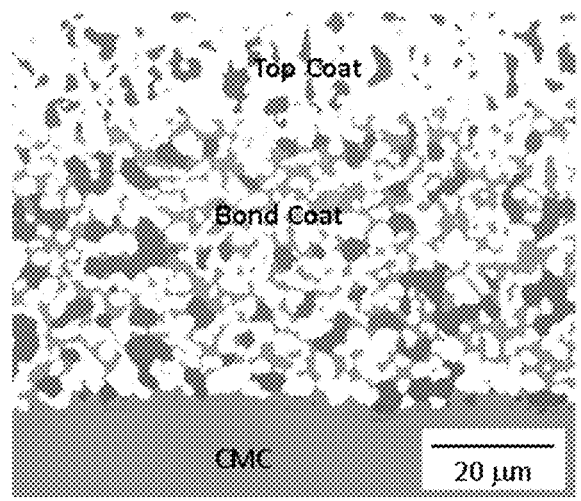
Figure 4A:
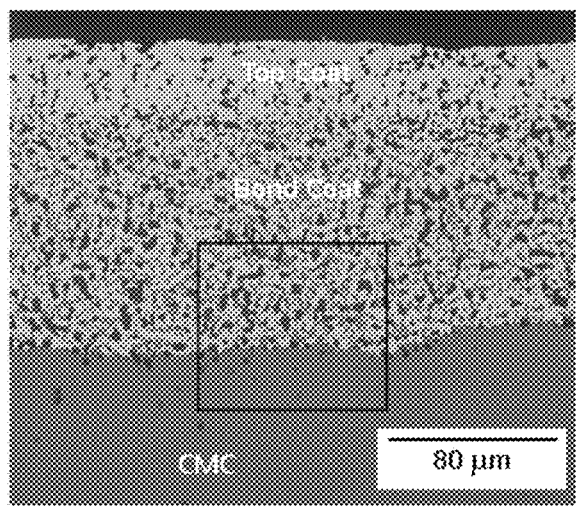
FIGS. 4A and 4B are low magnification (FIG. 4A) and high magnification (FIG. 4B) images showing a cross-section of an EBC according to an embodiment of the innovation with $Yb_2Si_2O_7$+1.0 mullite+10 Si (wt %) bond coat and $Yb_2Si_2O_7$+0.2 mullite (wt %) top coat sintered at 1525° C. for 3 hours followed by 100 h/100 cycle steam cycling at 2600° F. in 90% $H_2O$-balance $O_2$. The cycle frequency is 1 hr at 2600° F. and 20 min at T<100° C. The TGO layer was about 5 microns after the exposure, which is significantly thinner than the TGO layer on other developmental 2700° F. EBCs after the same exposure (10 microns or more).
Figure 4B:
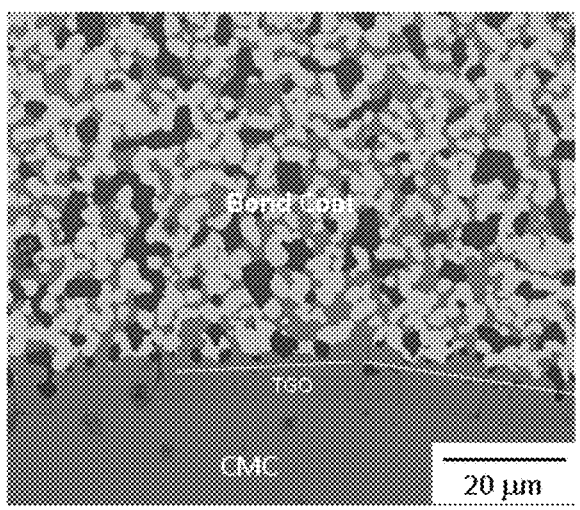

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

Next generation CMCs with temperature capability of up to 1482° C. (2700° F.) require a new class of EBCs with bond coat temperature capability of up to 1482° C. Currently there are no bond coats that are viable at 1482° C. (2700° F.) in engine environments. Steam oxidation life of at least 500 hours at 1482° C. (2700° F.) is required to be deemed viable at 1482° C. (2700° F.). In addition to a higher temperature capability, EBC technology significantly improving EBC steam oxidation life is needed.

The innovation provides an EBC system and a method for fabricating an EBC system that improves EBC steam oxidation life. In one embodiment, the innovation includes a slurry EBC system that provides enhanced steam oxidation life and improved temperature capabilities. In another embodiment, steam oxidation life of a silicon bond coat is improved by slowing down the migration of $H_2O$ through EBC.

According to an aspect, the innovation provides a slurry EBC system with improved temperature capabilities and greater steam oxidation life. In one embodiment, the EBC system includes a mullite-based bond coat. In another embodiment, the slurry EBC system includes a rare earth disilicate-based bond coat.

In a first embodiment, the slurry EBC system comprises a mullite-based bond coat and a top coat, wherein the top coat comprises at least two layers. The mullite-based bond coat has a temperature capability of up to 2700° F. and the top coat layers each have a temperature capability of at least 2700° F. The first top coat layer may include a coating material comprising $HfSiO_4$. The second top coat layer may include a coating material comprising a rare earth di-silicate ($RE_2Si_2O_7$), wherein RE is a rare earth metal selected from ytterbium, gadolinium, neodymium, samarium, lutetium, erbium, europium, terbium, dysprosium, holmium, lanthanum, cerium, praseodymium, promethium, thulium (i.e., lanthanides), plus yttrium and scandium.

In one embodiment, the EBC system may include additional outer top coat layer(s) comprising $RE_2SiO_5$, $RE_2O_3$, stabilized $ZrO_2$ and/or stabilized $HfO_2$.

The slurry coating comprises coating material, a primary sintering aid, at least one secondary sintering aid, solvent, and organic processing aids. In one embodiment, the sintering aid is an oxide-based sintering aid. Functions of oxide-based sintering aids include: i) densifying as-deposited slurry coating by generating liquid phases via reactions with coating material and other sintering aids, which fill the gaps between particles of the coating material and; ii) enhancing the bonding and performance of the coating by generating reaction products via reactions with coating material and other sintering aids, which are beneficial to bonding and performance. Without being bound by theory, consolidation of coating occurs due to liquid phase sintering. Mullite, $HfSiO_4$ and $RE_2Si_2O_7$ react with sintering aids to form liquid reaction products. Liquid phases fill the gaps between the particles of coating material, leading to liquid phase sintering and consolidation of coating. Sintering temperature (>1500° C.) is higher than the max bond coat operation temperature (2700° F.) and thus no new liquid phases are formed during operation.

Processing according to the innovation is lower-cost compared to conventional coating processes such as plasma spraying, PVD, and CVD. The method according to the innovation facilitates non-line-of-sight processing, thus, enabling EBC manufacturing on complex components with non-line-of-sight areas such as doublet and triplet vanes and internal surfaces. In addition, processing according to the innovation provides flat and smooth surface finish by filling valleys on undulated surfaces, which provides excellent aerodynamic performance without post-process polishing.

According to the innovation, selection of the oxide-based sintering aids facilitates liquid phase sintering of the layers (e.g., the mullite, $HfSiO_4$, $RE_2Si_2O_7$, $RE_2SiO_5$ layer(s)) at any desired temperature. In addition, the mullite-based bond coat according to the innovation can strongly bond to the substrate (e.g., CMC) to enable long oxidation life in steam. In one embodiment, the coating material for the bond coat may comprise about 70 wt % to about 89.9 wt % mullite. In one embodiment, the coating material may comprise about 80 wt % to about 89.9 wt % mullite.

In one embodiment, the primary sintering aids for the bond coat may comprise about 1 wt % to about 30 wt % silicon. In one embodiment, the primary sintering aids may comprise about 10 wt % to about 20 wt % silicon.

The at least one secondary sintering aids for the bond coat may be selected from about 0.1 wt % to about 20 wt % $RE_2Si_2O_7$; about 0.1 wt % to about 20 wt % $Y_2Si_2O_7$, about 0.1 wt % to about 20 wt % YAG ($Y_3Al_5O_{12}$), about 0.1 wt % to about 20 wt % YbAG ($Yb_3Al_5O_{12}$), about 0.1 wt % to about 20 wt % $Al_2O_3$, and about 0.1 wt % to about 20 wt % $TiO_2$, or any combination of two or more thereof. In one embodiment, the secondary sintering aid may comprise about 0.1 wt % to about 10 wt % $Yb_2Si_2O_7$. In one embodiment, the at least one secondary sintering aid comprises about 5 wt % to about 10 wt % of the coating material.

In one embodiment, the bond coat comprises mullite+7 $Al_2O_3$+1.3 $Yb_2Si_2O_7$+10 Si (wt %) sintered in air at 1525° C. for 3 hours after application of the bond coat by dipping. FIG. 1 is an image depicting this embodiment and shows good chemical compatibility between the layers. In another embodiment, the bond coat comprises mullite+7 $Al_2O_3$+20 Si (wt %).

The first top coat layer of the slurry EBC according to the innovation may comprise a coating material, a primary sintering aid, an optional secondary sintering aid, a solvent, and an organic processing aid. The coating material for the first top coat layer may comprise about 80 wt % to about 99 wt % $HfSiO_4$.

Primary sintering aids for the first top coat layer may comprise about 1 wt %-20 wt % silicon.

Secondary sintering aids for the first top coat layer may comprise about 0.1 to about 20 wt % mullite, about 0.1 wt % to about 20 wt % YAG ($Y_3Al_5O_{12}$), about 0.1 wt % to about 20 wt % YbAG ($Yb_3Al_5O_{12}$), about 0.1 to about 20 wt % $Yb_2Si_2O_7$, about 0.1 wt % to about 20 wt % $Y_2Si_2O_7$, about 0.1 wt % to about 20 wt % $Al_2O_3$, and about 0.1 wt % to about 20 wt % $TiO_2$, or any combination of two or more thereof.

The second top coat layer of the slurry EBC may comprise a coating material, a primary sintering aid, an optional secondary sintering aid, a solvent, and an organic processing aid. The coating material for the third layer may comprise about 70 wt % to about 99.9 wt % $RE_2Si_2O_7$. In one embodiment, the coating material may comprise about 70 wt % to about 99.9 wt % $Yb_2Si_2O_7$ or $Y_2Si_2O_7$. In one embodiment, the coating material comprises 70 wt % to 99.9 wt % $Yb_2Si_2O_7$.

Primary sintering aids for the second top coat layer may comprise about 0.1 wt % to about 10 wt % mullite.

The second top coat layer may additionally include an optional secondary sintering aid. The secondary sintering aid may comprise about 0.1 wt %-to about 20 wt % YAG ($Y_3Al_5O_{12}$), about 0.1 wt % to about 20 wt % YbAG ($Yb_3Al_5O_{12}$), about 0.1 wt % to about 20 wt % $Al_2O_3$, and about 0.1 wt % to about 20 wt % $TiO_2$, or any combination of two or more thereof.

In one embodiment, the bond coat layer may comprise mullite+7 $Al_2O_3$+1.3 $Yb_2Si_2O_7$+10 Si (wt %); the first top coat layer may comprise $HfSiO_4$+5 Si (wt %); and the second top coat layer may comprise $Yb_2Si_2O_7$+0.2 mullite (wt %). FIG. 2A is an SEM of a cross-section of a post-steam cycle three-layer EBC comprising these three layers. It was sintered in air at 1525° C. for 3 hours followed by 100 h/100 cycle steam cycling at 2600° F. in 90% $H_2O$-balance $O_2$. The cycle frequency was 1 hr at 2600° F. and 20 min at T<100° C. The thermally grown oxide (TGO) layer was about 5 microns after the exposure, which is significantly thinner than the TGO layer on other developmental 2700° F. EBCs after the same exposure (10 microns or more) (FIG. 2B).

The thermal cycling frequency was 1 hour at 2600° F. and 20 minutes at low temperature (<100° C.). As can be seen, the bond coat remains strongly bonded (FIG. 2A) to the CMC with a layer of thermally grown oxide (TGO) between the CMC and the bond coat. (FIG. 21B).

Solvent for all layers may comprise most any suitable solvent. In one embodiment, the solvent may be an alcohol and may or may not include water. In one embodiment, the solvent may be ethanol, methanol, ethyl alcohol, or a combination thereof. In one embodiment the solvent may be water and may or may not include an alcohol. Organic processing aids for all layers may comprise most any suitable dispersant and most any suitable binder. In one embodiment, a suitable dispersant may comprise polyethyleneimine (PEI), polyacrylic acid (PAA), Darvan® 821-A (ammonium polyacrylate). A suitable binder may comprise polyvinylbutyral (PVB) and polyvinylpyrollidone (PVP).

Without being bound by theory, the $RE_2Si_2O_7$-based second top coat layer may function to enhance $H_2O$ recession resistance because the mullite-based coating lacks $H_2O$ recession resistance. The $HfSiO_4$-based first top coat layer is a chemical barrier to prevent chemical reaction between the mullite-based bond coat and the $RE_2Si_2O_7$-based second top coat layer.

Optionally, one or more outer top coat layers maybe added over the second top coat layer to enhance the functionality of the EBC, such as water vapor recession resistance, CMAS resistance, erosion resistance, impact resistance, etc.

In one embodiment, a $RE_2SiO_5$, $RE_2O_3$, stabilized $ZrO_2$ or stabilized $HfO_2$ outer top coat layer may be added to improve $H_2O$ recession resistance.

In one embodiment, the EBC may include multiple outer top coat layers comprising any one of $RE_2SiO_5$, $RE_2O_3$, stabilized $ZrO_2$ or stabilized $HfO_2$. In one embodiment, the outer layer(s) may be a $RE_2SiO_5$-based outer layer wherein the coating material of the outer layer comprises about 70 wt % to about 99.9 wt % $RE_2SiO_5$, a primary sintering aid comprising about 0.1 wt % to about 10 wt % mullite, an optional secondary sintering aid comprising about 0.1 wt % to about 20 wt % YAG ($Y_3Al_5O_{12}$), about 0.1 wt % to about 20 wt % YbAG ($Yb_3Al_5O_{12}$), about 0.1 wt % to about 20 wt % $Al_2O_3$, and about 0.1 wt % to about 20 wt % $TiO_2$, or any combination of two or more thereof. In one embodiment, the coating material of the outer layer comprises about 70 wt % to about 99.9 wt % $Yb_2SiO_5$ and $Y_2SiO_5$.

In one embodiment, to mitigate thermal expansion mismatch between a $RE_2Si_2O_7$-based second top coat layer and an outer top coat layer, a $RE_2Si_2O_7$+outer layer mixture layer may be placed between the second top layer and the outer layer. Examples of mixture layers include 50 volume % $RE_2Si_2O_7$+50 volume % $RE_2SiO_5$ or compositional grading such as 75 volume % $RE_2Si_2O_7$+25 volume % $RE_2SiO_5$/ 50 volume % $RE_2Si_2O_7$+50 volume % $RE_2SiO_5$/25 volume % $RE_2Si_2O_7$+75 volume % $RE_2SiO_5$.

In one embodiment, the outer top coat layers may comprise a first outer top coat layer comprising $RE_2SiO_5$ applied to the top coat layer. In another embodiment, a second outer top coat layer comprising $RE_2O_3$ may be fabricated and applied to the first outer top coat layer.

According to a second embodiment, the innovation provides a rare earth disilicate-based ($RE_2Si_2O_7$-based) slurry EBC system comprising at least two layers (e.g., a bond coat and top coat). The first layer is a bond coat capable of withstanding temperatures of about 2700° F. and the second layer is a top coat capable of withstanding temperatures of at least 2700° F. The slurry coating comprises coating material, primary sintering aids, secondary sintering aids, solvent, and organic processing aids.

The coating material for the bond coat may comprise about 70 wt % to about 99 wt % $RE_2Si_2O_7$. In one embodiment, the coating material may comprise about 70 wt % to about 99 wt % $Yb_2Si_2O_7$.

The bond coat may comprise a primary sintering aid and a secondary sintering aid. Primary sintering aids for the bond coat may comprise about 1 wt % to about 30 wt % silicon.

The at least one secondary sintering aid for the bond coat may comprise about 0.1 wt % to about 20 wt % mullite, about 0.1 wt % to about 20 wt % YAG ($Y_3Al_5O_{12}$), about 0.1 wt % to about 20 wt % YbAG ($Yb_3Al_5O_{12}$), about 0.1 wt % to about 20 wt % $Al_2O_3$, and about 0.1 wt % to about 20 wt % $TiO_2$, or any combination of two or more thereof. In one embodiment, the secondary sintering aid is mullite.

The top coat of the slurry $RE_2Si_2O_7$-based EBC may comprise a coating material, primary sintering aids, optional secondary sintering aids, solvent and organic processing aids.

Coating material for the second layer may comprise 70 wt %-99.9 wt % $RE_2Si_2O_7$.

Primary sintering aids for the second layer may comprise 0.1 wt %-10 wt % mullite.

The optional secondary sintering aids for the second layer may comprise about 0.1 wt % to about 10 wt % YAG ($Y_3Al_5O_{12}$), 0.1 wt % to about 10 wt % YbAG ($Yb_3Al_5O_{12}$), about 0.1 wt % to about 10 wt % $Al_2O_3$, and about 0.1 wt % to about 10 wt % $TiO_2$, or any combination of two or more thereof.

Solvent for both the bond coat and the top coat may comprise most any suitable solvent. In one embodiment, the solvent is an alcohol and may or may not include water. In one embodiment, the solvent is ethanol, methanol, ethyl alcohol, or a combination thereof and water. In one embodiment, the solvent is water and may or may not include an alcohol.

Organic processing aids for both the bond coat and the second layer may comprise most any suitable dispersant and binder. Suitable dispersants include polyethyleneimine (PEI), polyacrylic acid (PAA), Darvan® 821-A (ammonium polyacrylate). Suitable binders include polyvinylbutyral (PVB) and polyvinylpyrollidone (PVP).

In one embodiment, the $RE_2Si_2O_7$-based slurry EBC may comprise one or more outer top coat layers added over (above) the top coat to enhance the functionality of the EBC, such as improving water vapor recession resistance, CMAS resistance, erosion resistance, impact resistance, etc. At least one $RE_2SiO_5$, $RE_2O_3$, stabilized $ZrO_2$ or stabilized $HfO_2$ outer top coat layer may be added.

In one embodiment, a $RE_2SiO_5$-based outer top coat layer may include a coating material comprising about 70 wt % to about 99.9 wt % $RE_2SiO_5$, a primary sintering aid comprising about 0.1 wt % to about 10 wt % mullite, an optional secondary sintering aids comprising about 0.1 wt % to about 20 wt % YAG ($Y_3Al_5O_{12}$), 0.1 wt % to about 20 wt % YbAG ($Yb_3Al_5O_{12}$), about 0.1 wt % to about 20 wt % $Al_2O_3$, and about 0.1 wt % to about 20 wt % $TiO_2$, or any combination of two or more thereof.

In one embodiment, to mitigate thermal expansion mismatch between the $RE_2Si_2O_7$-based second layer and outer layer, a $RE_2Si_2O_7$+outer layer mixture layer may be placed between the second layer and the outer layer.

In one embodiment, the outer top coat layers may comprise a first outer top coat layer comprising $RE_2SiO_5$ applied to the top coat layer. In another embodiment, a second outer top coat layer comprising $RE_2O_3$ may be fabricated and applied to the first outer top coat layer.

According to an aspect, the innovation provides a method of fabricating a slurry EBC coating via various methods including dipping, spinning, spin-dipping, painting, and spraying.

Figure 5:
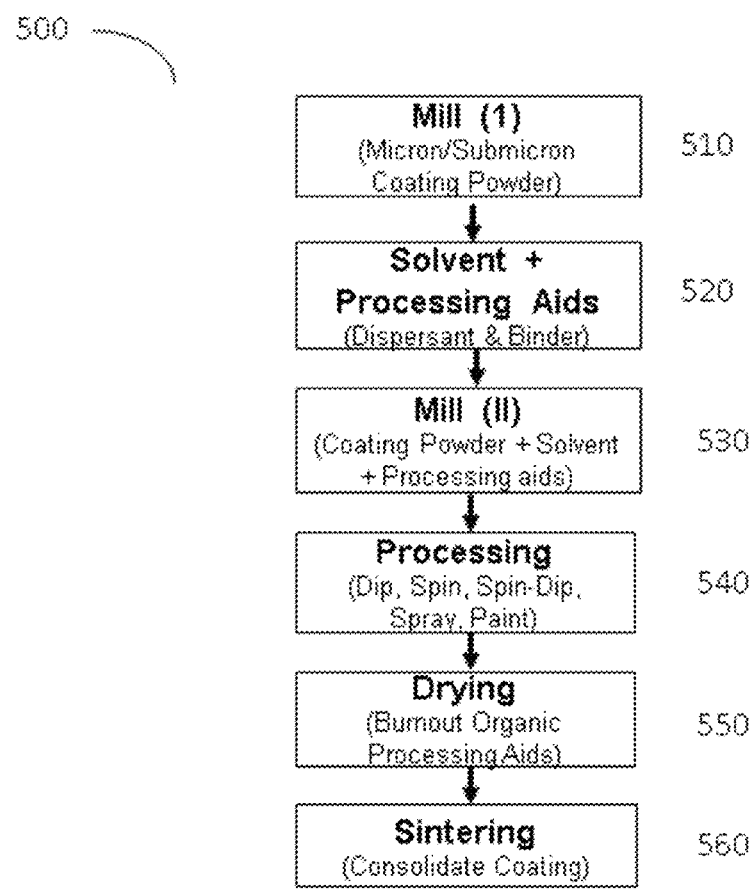
FIG. 5 is a slurry EBC process flow chart depicting the fabrication steps for a slurry EBC according to an embodiment of the innovation.

Referring now to FIG. 5, a flow diagram of a method 500 of fabricating a slurry EBC is shown, according to an example embodiment. The method 500 may be used to fabricate each of the layers discussed herein (e.g., a bond coat layer and a top coat layer). For example, in one embodiment, the method 500 may be used to fabricate a mullite-based bond coat as described above. It should be appreciated that while FIG. 5 is depicted and described as a method for fabricating an EBC, the method may be used to fabricate a portion of an EBC (e.g., a bond coat layer or a top coat layer).

It should be appreciated that the various operations of the method 500 depicted in FIG. 5 can be accomplished by other means and for other purposes. In addition, while the operations are set forth in an order in FIG. 5, they need not be performed in the order depicted. For example, some in some embodiments, the operations may be combined, in a different order, or some operations may be omitted.

In one embodiment, the method of slurry coating fabrication may comprise operation 510 which results in a milled coating powder. In one embodiment, operation 510 includes 1) creating a mixture of a coating material, sintering aid(s), and solvent and then milling the mixture in a milling media to form a first slurry and 2) Filtering and drying the first slurry to form a milled powder of coating material and sintering aids.

In one embodiment, the operation 510 may include 1) Mixing a coating material, sintering aids, and ethanol and milling the mixture (e.g., in a planetary mill) in a milling media. In one embodiment, milling occurs at 500 rpm for 30 min-1 hr. In one embodiment, milling may occur with zirconia bowl and zirconia milling media (3 mm dia balls); 2) Filtering out the milling media and drying the ethanol from the milled mixture to form a milled powder of coating material and sintering aids.

In one embodiment, the operation 520 may include mixing the milled powder of coating material and sintering aids with a solution comprising a solvent and organic processing aids. In some embodiments, this operation 520 may be combined with other operations.

In an operation 530, the resulting mixture is milled (e.g., in a ball mill) to form a second slurry comprising the coating powder, solvent, and processing aids. In an operation 540, the coating layer (e.g., a bond coating layer or a top coating layer) may be processed via dipping spinning, spin-dipping, painting, or spraying.

Operation 540 includes processing/application of the coating by dipping, spinning, spin-dipping, spraying, or painting. In one embodiment, fabricating may be done via most any suitable method, including by plasma-spraying, PVD including EB-PVD, PS-PVD and DVD, and CVD.

Drying, (binder burn-out) 550 and sintering operations 560 can be conducted either after each coating layer is applied or after all layers are applied.

In one embodiment, the fabrication process may include 1) Mixing a coating material, sintering aids, and ethanol and milling the mixture (e.g., in a planetary mill) in a milling media. In one embodiment, milling occurs at 500 rpm for 30 min-1 hr. In one embodiment, milling may occur with zirconia bowl and zirconia milling media (3 mm dia balls); 2) Filtering out the milling media and drying the ethanol from the milled mixture to form a milled powder of coating material+sintering aids; 3) Preparing a solution of solvent and organic processing aids by mixing solvent and organic process aids in a ball mill; 4) Mixing milled powder of coating material+sintering aids with solvent+organic processing aids solution and milling the mixture in a ball mill with milling media (e.g., zirconia milling media or alumina); 5) Fabricating green coating via dipping, spraying, painting, spinning, spin-dipping, etc.; 6) Drying green coating in air, vacuum, or inert gas (e.g., nitrogen or argon) at room temperature for at least 6 hr. In one embodiment, dying may be done above room temperature up to about 200° C. in air, vacuum, or inert gas for at least 6 hr.; 7) Burn out binder from dried green coating by heating from room temperature to about 600° C.-650° C. in air, vacuum, or inert gas at about 5° C.-10° C. per min followed by 1-5 hr dwelling at 600-650° C. In one embodiment, burn out may be accomplished by heating from room temperature to about 500° C.-600° C. in air, vacuum, or inert gas at about 5° C.-10° C. per min followed by 1-5 hr dwelling at 500° C.-600° C.; 8) Sintering for final consolidation. In one embodiment, sintering may be done at 1500° C.-1700° C. for 1-10 h. In one embodiment, sintering may be done at temperatures below about 1500° C. by adjusting the type and amount of sintering aids to produce liquid phases at temperatures below 1500° C.

In one embodiment, drying, binder burn-out and sintering steps can be conducted either after each layer is applied or after all layers are applied. In one embodiment, drying, binder burn-out, and sintering steps are conducted after each layer is applied.

In one embodiment, the slurry EBC according to the innovation may be used in any suitable application, including, but not limited to gas turbine engines, turbine blades, turbine vanes, turbine bladetracks, and/or combustor liners.

According to another aspect, the innovation may provide an EBC system to improve EBC steam oxidation life for an EBC system having a silicon-containing bond coat by slowing the migration of oxidants (e.g., $H_2O$).

Advanced engine hot section materials for use in many applications, including air travel, is a critical technology required to keep the fuel consumption and emission to a minimum in the next generation gas turbines. SiC/SiC ceramic matrix composites (CMCs) are the most promising material to revolutionize gas turbine hot section materials technology because of their high-temperature mechanical properties, excellent high-temperature oxidation resistance in air, and light weight. Volatilization of $SiO_2$ scale by water vapor generated by combustion reactions and the resulting rapid surface recession is a significant concern for CMCs.

Figure 6:
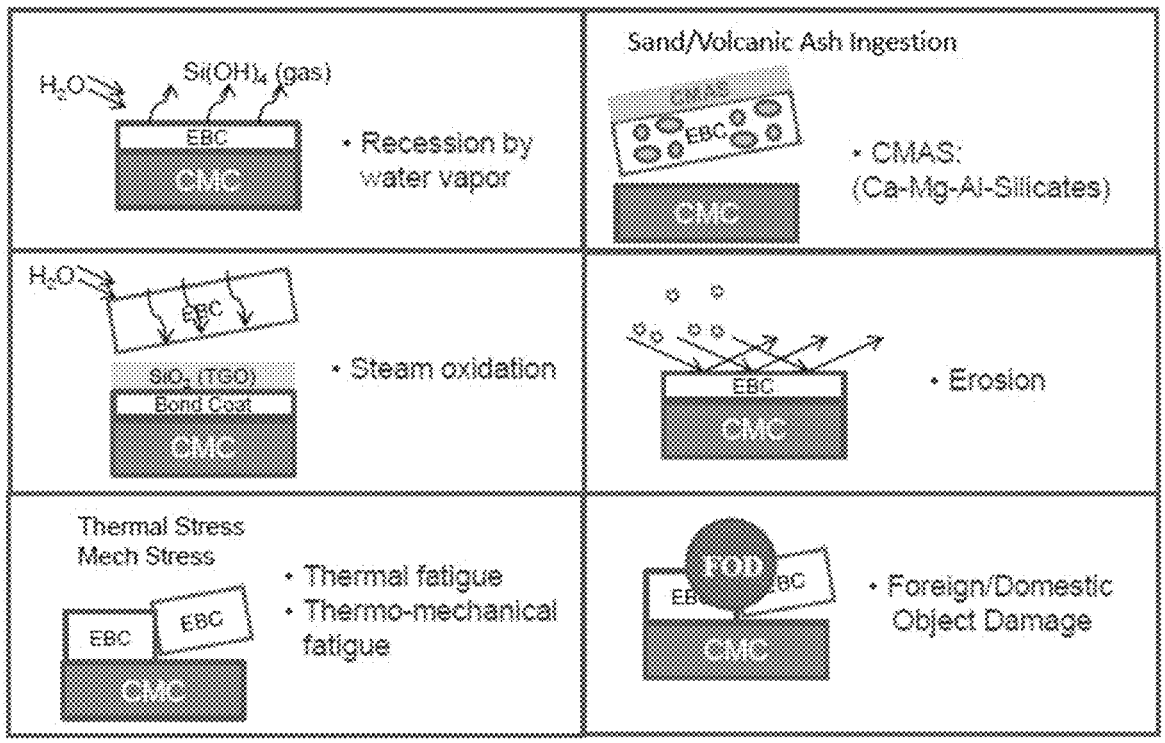
FIG. 6 is a schematic showing examples of various EBC failure modes.

Environmental barrier coatings (EBCs) represent an enabling technology for CMCs by protecting CMCs from water vapor recession. The implementation of CMCs in gas turbines represents daunting challenges because failure of EBC leads to a rapid reduction in CMC component life. Long-life EBCs that last for the life of CMC components, therefore, are on the critical path to the successful implementation of CMCs. Key contributors to EBC failure include water vapor-induced recession, water vapor-induced oxidation, degradation by calcium-aluminum-magnesium silicates (CMAS) deposits, thermal and thermo-mechanical strains, particle erosion, and foreign object damage (FOD). FIG. 6 schematically shows examples of various EBC failure modes.

Water vapor is the primary oxidant for Si or SiC oxidation in water vapor+oxygen environments. The diffusivity of $H_2O$ in $SiO_2$ is about 100 times lower than that of $O_2$ in $SiO_2$, while the solubility of $H_2O$ in $SiO_2$ is about 1000 times greater than that of $O_2$ in $SiO_2$. Since permeability=diffusivity×solubility, the permeability of $H_2O$ in $SiO_2$ is about 10 times larger than that of $O_2$. In $Si/Yb_2Si_2O_7$ EBC water vapor permeates through $Yb_2Si_2O_7$ and reacts with the Si bond coat, forming a layer of $SiO_2$ scale, known as thermally grown oxide (TGO), at the $Si/Yb_2Si_2O_7$ interface. One of the most frequently observed EBC failure modes, identified in laboratory tests and confirmed in rig and engine tests, is spallation due to oxidation by water vapor (steam oxidation). In a $Si/Yb_2Si_2O_7$ EBC, oxidants have to permeate through two layers, $Yb_2Si_2O_7$ and TGO, before they can react with Si to grow more TGO. As such the layer that is less permeable to oxidants will control the TGO growth rate. As described herein, in an example embodiment, modifiers to the top coat layer of a $Si/Yb_2Si_2O_7$ EBC results in such a layer that slows the TGO growth rate.

Laboratory steam oxidation tests have shown that EBCs fail at TGO when TGO reaches a critical thickness. Thermal barrier coating (TBC) based on yttria-stabilized zirconia (YSZ) also typically fails at or near TGO and the failure is attributed to the strain energy resulting from thermal expansion mismatch between TGO and YSZ. The similar failure mode between the two coatings suggests that the strain-energy induced TBC failure mechanism is likely applicable to EBC failure. Sources for strain energy due to the formation of $SiO_2$ TGO in EBCs include growth stress due to ~2.2× volume expansion during the conversion of Si to $SiO_2$, phase transformation stress (in the case of crystalline $SiO_2$ TGO) due to p to a cristobalite transition at ~200° C. which is accompanied by ~5% volume reduction, and thermal stress due to the mismatch in coefficient of thermal expansion (CTE) between a cristobalite ($10.3 \times 10^{-6}$/° C.) and EBC ($4 \sim 5 \times 10^{-6}$/° C.).

The failure mechanism of BSAS and $Y_2Si_2O_7$+BSAS EBCs on C/SiC composites with a SiC bond coat has been investigated at 1250° C. in water vapor (50% $H_2O$+50% $O_2$). BSAS and $Y_2Si_2O_7$+BSAS EBCs were fabricated by a slurry process. In both EBCs $SiO_2$ TGO formed on the SiC bond coat and cracks formed at the TGO/SiC bond coat interface. The cracks propagated along the interface when the TGO reached a critical thickness (4~5 μm), leading to EBC spallation. The strength of post-oxidation samples was determined using a three-point bend test. Significant strength reduction (>90% of the initial strength) was observed after the TGO reached the critical thickness. It was proposed that EBC fails when the stress resulting from the silica TGO formation becomes greater than the bond strength between the TGO and SiC bond coat. Other studies have similarly shown that TGO thickness is correlated with EBC failure.

Some EBC systems comprise a silicon-based bond coat adjacent a top coat layer that is rare earth silicate based, (e.g., $Yb_2Si_2O_7$ or $Y_2Si_2O_7$-based EBC systems). These $Si/RE_2Si_2O_7$ EBC systems provide protection to a CMC surface to improve the life of CMCs during operation. In combustion environments, water vapor can migrate through rare earth silicate-based EBC systems (e.g., $RE_2Si_2O_7$) resulting in oxidization of the Si-containing bond coat. Oxidation forms a layer of silica ($SiO_2$) known as TGO (thermally grown oxide) at the $Si/RE_2Si_2O_7$ interface. As TGO grows in thickness with time, the strain energy increases due to thermal expansion mismatch between TGO and $RE_2Si_2O_7$. When the strain energy reaches the interfacial toughness of the $TGO/RE_2Si_2O_7$ interface, EBC fails at the $TGO/RE_2Si_2O_7$ interface. The steam oxidation life of EBCs, therefore, is proportional to TGO growth rate. For example, current $Si/Yb_2Si_2O_7$ EBCs fails at ~500 h at 2400° F. steam cycling (1 h at high temperature and 20 min at room temperature) in 90% $H_2O$-balance $O_2$, which is well short of the >10,000 h life goal for CMC components.

In one embodiment, the innovation provides EBC systems that improve EBC life by reducing TGO growth rates in EBC systems comprising a silicon-containing bond coat. In one embodiment, the EBC comprises a silicon bond coat and a top coat comprising at least one layer of a chemically modified $RE_2Si_2O_7$.

Figure 7:
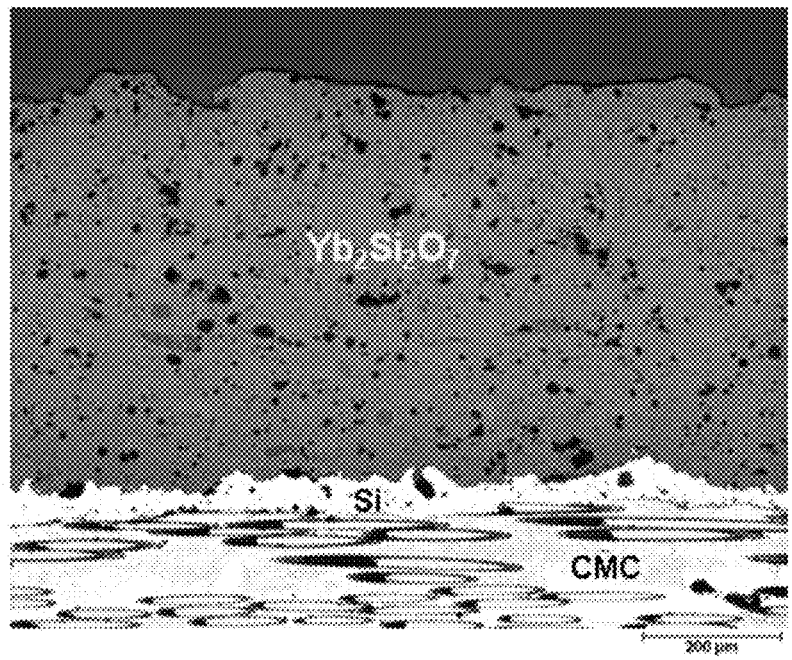
FIG. 7 is an image showing a cross-section of an as-processed Si/$Yb_2Si_2O_7$ EBC

Referring now to FIGS. 7-9 that depict unmodified (FIGS. 7 and 8) and modified $Si/Yb_2Si_2O_7$(FIG. 9) EBC. FIG. 7 depicts an as-processed $Si/Yb_2Si_2O_7$ EBC showing the interface between the silicon bond coat and the $Yb_2Si_2O_7$ top coat.

Figure 8A:
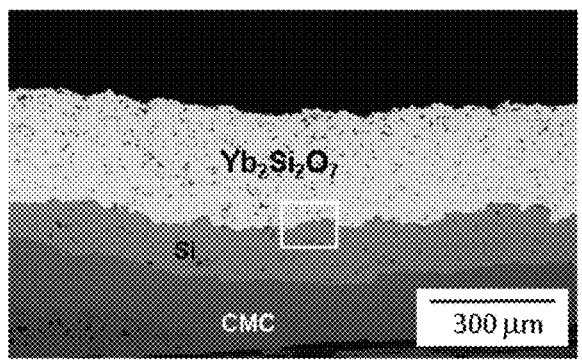
FIGS. 8A and 8B are low magnification (FIG. 8A) and high magnification (FIG. 8B) images showing a cross-section of a Si/$Yb_2Si_2O_7$EBC after 100 h/100 cycle steam cycling at 2400° F. in 90% $H_2O$-balance $O_2$. The cycle frequency is 1 hour at 2400° F. and 20 min at T<100° C.
Figure 8B:
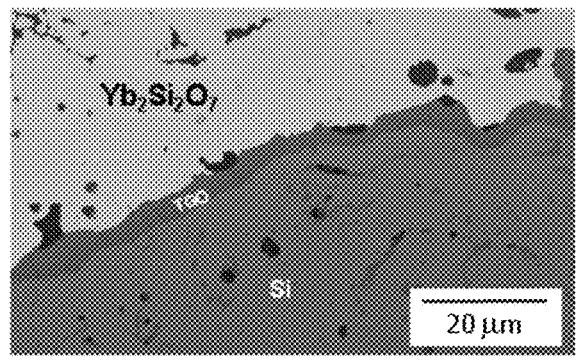

FIG. 8 depicts a $Si/Yb_2Si_2O_7$ EBC after 100 h/100 cycle steam cycling at 2400° F. in 90% $H_2O$-balance $O_2$. The cycle frequency is 1 hour at 2400° F. and 20 min at T<100° C. FIG. 8B is a higher magnification image of the indicated portion of the EBC of FIG. 8A and depicts the TGO layer between the Si bond coat and the $Yb_2Si_2O_7$ top coat.

Figure 9A:
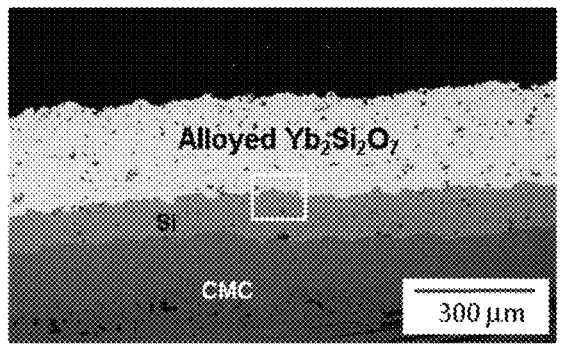
FIGS. 9A and 9B are low magnification (FIG. 9A) and high magnification (FIG. 9B) images showing a cross-section of Si/($Yb_2Si_2O_7$+1.39 mullite+2.33 YAG ($Y_3Al_5O_{12}$) (wt %) EBC after 100 h/100 cycle steam cycling at 2400° F. in 90% H2O-balance O2.
Figure 9B:
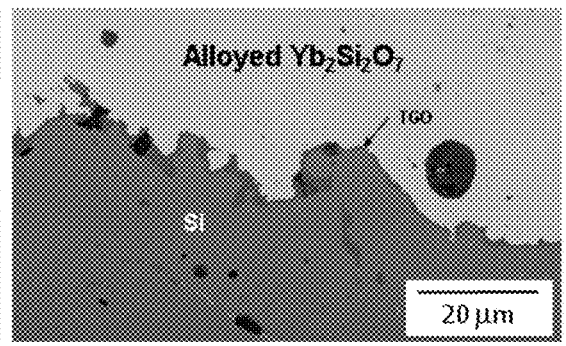

FIG. 9 depicts a modified $Si/(Yb_2Si_2O_7+1.39$ mullite+ 2.33 YAG ($Y_3Al_5O_{12}$) (wt %) EBC after 100 h/100 cycle steam cycling at 2400° F. in 90% H2O-balance O2. FIG. 9B is a higher magnification image of the indicated portion of the EBC of FIG. 9A. The cycle frequency is 1 hr at 2400° F. and 20 min at T<100° C. TGO thickness after 100 h/100 cycle steam oxidation was reduced from ~3.5 microns on $Yb_2Si_2O_7$ to ~0.5 microns on modified $Yb_2Si_2O_7$, about a seven-fold reduction. The results demonstrate the significant benefits of chemical modification to enhancing steam oxidation resistance of modified $RE_2Si_2O_7$ EBC.

In one embodiment, the innovation may improve the steam oxidation life of the silicon bond coat of the EBC system by slowing oxidation of the Si bond coat. In one embodiment, the EBC system comprises $Si/RE_2Si_2O_7$ EBC systems, wherein RE is a rare earth element (Yb, Y, Gd, Lu, Sc, Er, Sm, Dy, Nd, La, Eu, Ho, Tm, Tb). In one embodiment, the EBC system may be a $Si/RE_2Si_2O_7$ EBC modified by adding at least one modifier oxide to the $RE_2Si_2O_7$ top coat. Suitable modifier oxides include mullite, YAG ($Y_3Al_5O_{12}$), YbAG ($Yb_3Al_5O_{12}$), $Al_2O_3$, $TiO_2$, or any combination thereof.

In one embodiment, the EBC system may include a $RE_2Si_2O_7$ top coat layer selected from Table 1.

TABLE 1

| Alloyed EBC Top Coat |
|---|
| RE2Si2O7 + (0.1-10 wt %) Mullite |
| RE2Si2O7 + (0.1-20 wt %) YAG |
| RE2Si2O7 + (0.1 -20 wt %) YbAG |
| RE2Si2O7 + (5-10 wt %) $Al_2O_3$ |
| RE2Si2O7 + (0.1-10 wt %) Mullite + (0.1-20 wt %) YAG |
| RE2Si2O7 + (0.1-10 wt %) Mullite + (0.1-20 wt %) YbAG |
| RE2Si2O7 + (0.1-10 wt %) Mullite + (0.1-10 wt %) $Al_2O_3$ |
| RE2Si2O7 + (0.1-10 wt %) Mullite + (0.1-10 wt %) $TiO_2$ |
| RE2Si2O7 + (0.1-10 wt %) Mullite + (0.1-20 wt %) YAG + (0.1-10 wt %) $Al_2O_3$ |
| RE2Si2O7 + (0.1-10 wt %) Mullite + (0.1-20 wt %) YbAG + (0.1-10 wt %) $Al_2O_3$ |
| RE2Si2O7 + (0.1-10 wt %) Mullite + (0.1 -20 wt %) YAG + (0.1-10 wt %) $TiO_2$ |
| RE2Si2O7 + (0.1-10 wt %) Mullite + (0.1 -20 wt %) YbAG + (0.1-10 wt %) $TiO_2$ |
| RE2Si2O7 + (0.1-10 wt %) Mullite + (0.1-20 wt %) YAG + (0.1-10 wt %) $Al_2O_3$ + (0.1-10 wt %) $TiO_2$ |
| RE2Si2O7 + (0.1-10 wt %) Mullite + (0.1-20 wt %) YbAG + (0.1-10 wt %) $Al_2O_3$ (0.1-10 wt %) $TiO_2$ |
| RE2Si2O7 + (0.1-20 wt %) YAG + (0.1-10 wt %) $Al_2O_3$ |
| RE2Si2O7 + (0.1-20 wt %) YbAG + (0.1-10 wt %) $Al_2O_3$ |
| RE2Si2O7 + (0.1-20 wt %) YAG + (0.1-10 wt %) $TiO_2$ |
| RE2Si2O7 + (0.1-20 wt %) YbAG + (0.1-10 wt %) $TiO_2$ |
| RE2Si2O7 + (0.1-20 wt %) YAG + (0.1-10 wt %) $Al_2O_3$ + (0.1-10 wt %) $TiO_2$ |
| RE2Si2O7 + (0.1 -20 wt %) YbAG + (0.1-10 wt %) $Al_2O_3$ + (0.1-10 wt %) $TiO_2$ |
| RE2Si2O7 + (5-10 wt %) $Al_2O_3$ + (0.1-10 wt %) $TiO_2$ |

In one embodiment, the innovation may provide a $Si/RE_2Si_2O_7$ EBC system modified with $Al_2O_3$ or $Al_2O_3$-containing oxide compounds. In one embodiment, the $Al_2O_3$ or $Al_2O_3$-containing oxide compounds may be mullite and/or YAG. In one embodiment, modifiers to the top cop may comprise 2.78% mullite; 2.33% YAG; 6% $Al_2O_3$; 1.39% mullite+4.66% YAG; 1.39% mullite+2.33% YAG; 1.39 mullite+2.33 YAG; 3% YbAG; or 1.39% mullite+3% YbAG.

As described in greater detail with regard to Example 1, collectively EBCs modified with $Al_2O_3$ or $Al_2O_3$-containing oxide compounds (e.g., mullite and YAG) reduced the TGO thickness by ~80% compared with the baseline EBC in 90% $H_2O$+10% $O_2$ at 1316° C. under thermal cycling. This TGO thickness reduction translates to EBC life improvements of ~20x. Further, according to Example 1, the modified EBC according to the innovation may improve the EBC life by ~60x compared with the baseline EBC. $TiO_2$ in the modifier appeared to negate the EBC life improvements. Table 2 provides additional example embodiments of suitable modifiers.

In one embodiment, the $RE_2Si_2O_7$ top coat layer may comprise optional additional outer top coat layer(s) comprising $RE_2SiO_5$, $RE_2O_3$, stabilized $ZrO_2$ and/or stabilized $HfO_2$ to enhance the functionality of the EBC, such as water vapor recession resistance, CMAS resistance, erosion resistance, impact resistance, etc.

In one embodiment, a $RE_2SiO_5$, $RE_2O_3$, stabilized $ZrO_2$ or stabilized $HfO_2$ outer top coat layer may be added to improve $H_2O$ recession resistance.

In one embodiment, the EBC may include multiple outer top coat layers comprising any one of $RE_2SiO_5$, $RE_2O_3$, stabilized $ZrO_2$ or stabilized $HfO_2$. In one embodiment, the outer layer(s) may be a $RE_2SiO_5$-based outer layer wherein the coating material of the outer layer comprises about 70 wt % to about 99.9 wt % $RE_2SiO_5$, a primary modifier comprising about 0.1 wt % to about 10 wt % mullite, an optional secondary modifier comprising about 0.1 wt % to about 20 wt % YAG ($Y_3Al_5O_{12}$), about 0.1 wt % to about 20 wt % YbAG ($Yb_3Al_5O_{12}$), about 0.1 wt % to about 20 wt % $Al_2O_3$, and about 0.1 wt % to about 20 wt % $TiO_2$, or any combination of two or more thereof.

In one embodiment, the outer top coat layers may comprise a first outer top coat layer comprising a $RE_2SiO_5$ coating material and a second outer top coat layer comprising an $RE_2O_3$ coating material.

The EBC may be applied by most any method including plasma spraying and/or physical vapor deposition, including atmospheric and low pressure plasma spray, electron beam-physical vapor deposition (EB-PVD), or plasma-spray physical vapor deposition (PS-PVD), and/or other deposition techniques such as high temperature vacuum vapor deposition, chemical vapor deposition, magnetron or cathodic arc physical vapor deposition, polymer derived coatings and slurry coatings. In one embodiment, the EBC may be applied by plasma spraying. plasma-sprayed EBC.

Example I

A study was undertaken to investigate whether TGO growth rates can be reduced by adding modifier oxides based on a hypothesis that modifier oxides dissolve in $SiO_2$ TGO and modify the $SiO_2$ network structure, making it less permeable to oxidants. Using a Si/$Yb_2Si_2O_7$-based EBC as the baseline, the $Yb_2Si_2O_7$ layer was modified by adding $Al_2O_3$ or $Al_2O_3$-containing oxide compounds, such as mullite and YAG ($Y_3Al_5O_{12}$), and $TiO_2$. Si/$Yb_2Si_2O_7$ was selected as the baseline over Si/mullite/$Yb_2Si_2O_7$ mainly to avoid the phase transformation-induced cracking of conventionally plasma-sprayed mullite. Mullite needs to be sprayed at a high temperature (>1000° C.) to avoid the deposition of amorphous phase and the resulting cracking in thermal exposure. Amorphous $Yb_2Si_2O_7$ on the other hand, does not show such a detrimental behavior, and thus high-temperature spraying is not required. Plasma spraying on heated parts inside a furnace is not desirable from manufacturing standpoint because it puts constraints on the maneuverability of complex parts during the spraying. Steam oxidation tests and post-test oxidation kinetics, microstructure, chemistry, and phase analysis were used to test the hypothesis.

Table 2 shows the list of modifiers and their chemistries investigated. Plasma spray powders of modified $Yb_2Si_2O_7$ chemistries were fabricated using spray dry process by Praxair Specialty Ceramics, Woodinville, Wash. Baseline Si/$Yb_2Si_2O_7$ and modified Si/$Yb_2Si_2O_7$ EBCs according to Table 2 were processed using air plasma spraying. The nominal coating thickness was 125 μm Si and 250 μm $Yb_2Si_2O_7$ or modified $Yb_2Si_2O_7$. The substrate was 2.54 cm×1.27 cm×0.32 cm CVI (chemical vapor infiltration) SiC/SiC CMC manufactured by Rolls-Royce HTC, Huntington Beach, Calif. EBC was coated on one large surface (2.54 cm×1.27 cm) of CMC substrates.

TABLE 2

Modifiers and their chemistries in wt %

| Modifier group | EBC ID | $Yb_2Si_2O_7$ | Mullite | $Al_2O_3$ | $Y_3Al_5O_{12}$ (YAG) | $TiO_2$ |
|---|---|---|---|---|---|---|
| Baseline | B | 100 | 0 | 0 | 0 | 0 |
| I | 6A | Balance | 0 | 0 | 0 | 0 |
| | M2Y | | 1.39 | 0 | 2.33 | 0 |
| | 3M | | 2.78 | 0 | 0 | 0 |
| | 2Y | | 0 | 0 | 2.33 | 0 |
| | M5Y | | 1.39 | 0 | 4.60 | 0 |
| II | M | Balance | 1.39 | 0 | 0 | 0 |
| | AT | | 0 | 1 | 0 | 1 |
| | MT | | 1.39 | 0 | 0 | 1 |

Environmental barrier coating-coated CMC coupons were tested in steam cycling rigs to investigate the oxidation kinetics. As-coated CMC samples were steam-cycled without post-process annealing. Water was injected through the gastight top flange using a peristaltic pump along with oxygen. The amount of water and oxygen is controlled so as to create ~90 vol. % $H_2O(g)$+~10 vol. % $O_2$ (g) (±3 vol. %) and 10 cm/s gas velocity in the hot zone of the reaction chamber. The reaction chamber is a 5 cm diameter alumina tube with gastight flanges on both ends. Water rapidly vaporizes as it passes through a pack of quartz wool located inside the reaction chamber near the top where T>200° C. Thermal cycling was created by moving the furnace and the reaction chamber up and down as a unit using a lift while the test samples hung at the end of a 1.15 mm thick Pt-40% Rh hangwire, are stationary. Moving the furnace and reaction chamber as a unit ensures the reaction chamber does not crack from thermal shocks. The thermal cycling frequency was 1 hour at 1316° C. and 20 minutes at low temperature (<100° C.). Three samples were tested for each chemistry, one for 100 cycles, one for 500 cycles, and one for 1000 cycles.

Oxidation kinetics was determined by measuring TGO thickness using scanning electron microscopy (SEM). Field emission SEM (Tescan, Bmo, Czech Republic) micrographs at 2000×-4000× magnifications were used to measure the TGO thickness at 5-6 locations per sample. Energy dispersive spectroscopy (EDS) was used for chemical analysis and X-ray diffraction (XRD) was used to determine crystalline phases.

Figure 10:
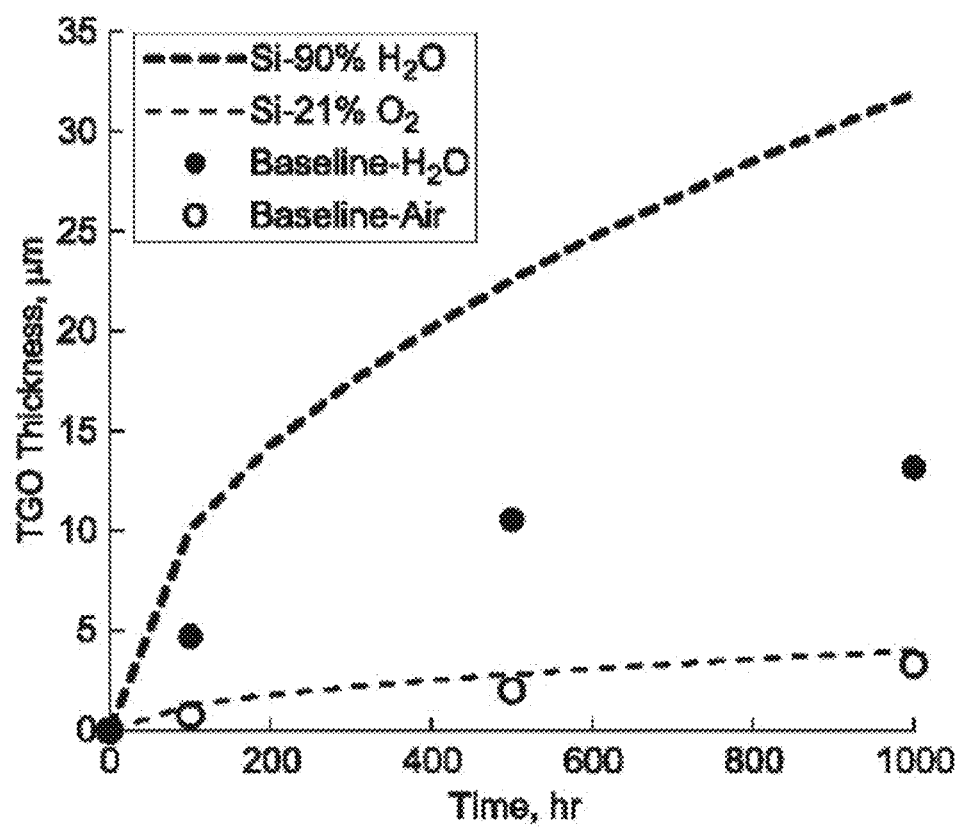
FIG. 10 is a plot depicting TGO thickness (μm) vs time (hours) for baseline Si/$Yb_2Si_2O_7$ EBC in air and 90% $H_2O$+10% $O_2$ at 1316° C. (symbols).
Figure 11:
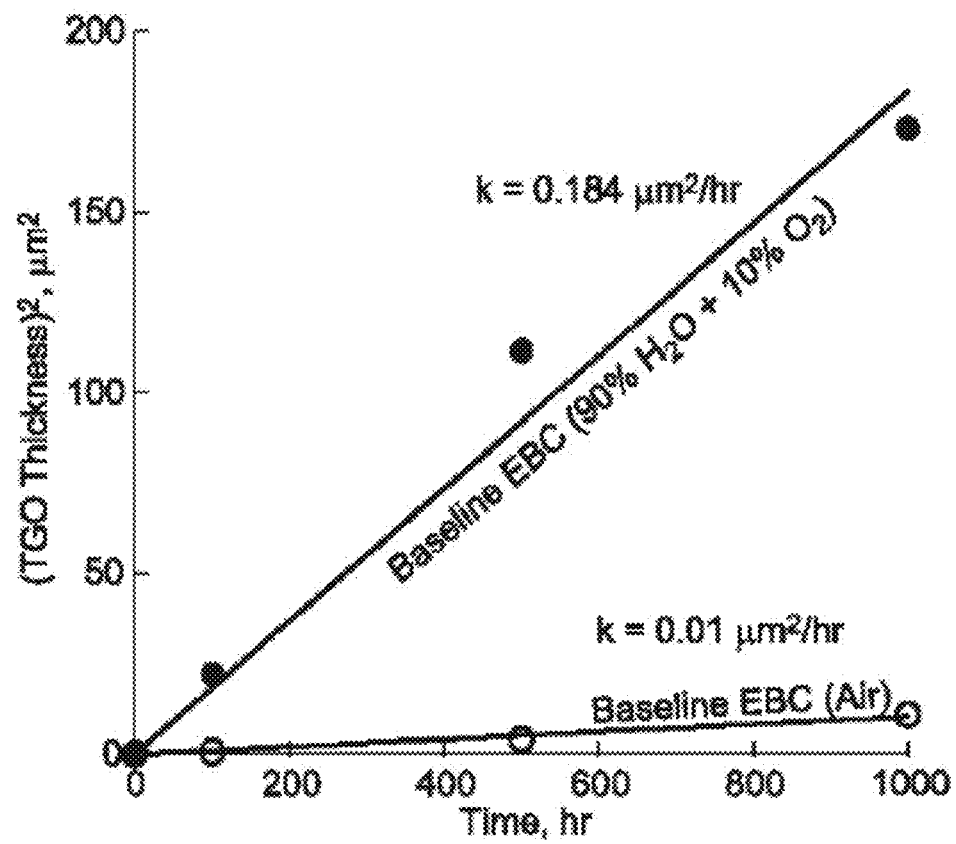
FIG. 11 is a plot depicting TGO thickness vs time for baseline EBC in air and 90% $H_2O$+10% $O_2$ at 1316° C. (symbols). Solid lines are linear regression analysis of the data points.

FIG. 10 is a plot of TGO thickness (μm) vs time (hours) and FIG. 11 is a plot of TGO (thickness)$^2$ vs time for baseline EBC in air and 90% $H_2O$+10% $O_2$ at 1316° C. (symbols). The oxidation kinetics of Si in 90% $H_2O$+10% $O_2$ and 21% $O_2$, extrapolated from Deal, et al., "General relationship for the thermal oxidation of silicon." J. Appl. Phys. (1965) (dashed lines), is overlaid in FIG. 10 for comparison. The slopes (solid lines) in FIG. 11 represent the parabolic oxidation rate constant (μm$^2$/h) of baseline EBC in air and 90% $H_2O$+10% $O_2$. The parabolic rate constant of Si in 90% $H_2O$+10% $O_2$ is 64× greater than that of Si in 21% $O_2$ (1.017/0.016=64). A similar trend is observed for the oxidation of EBC, i.e., the parabolic rate constant of baseline EBC in 90% $H_2O$+10% $O_2$ is 18.4× greater than that in air (0.184/0.01=18.4).

Figure 12:
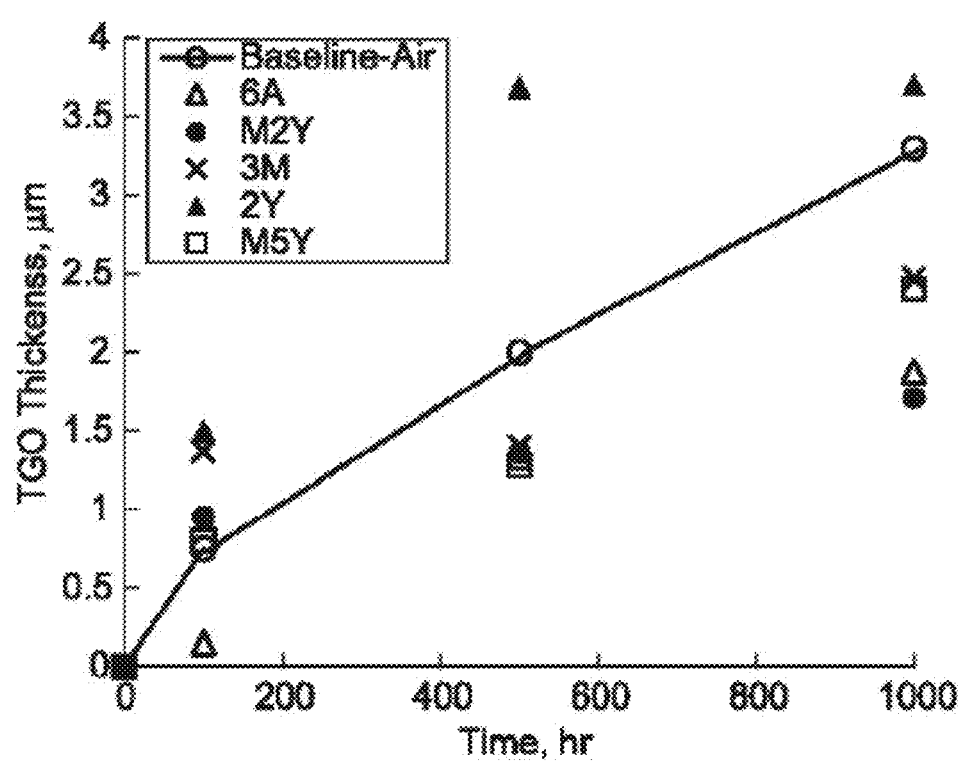
FIG. 12 is a plot of TGO thickness (µm) vs time (hours) for Group I (Table 3) modified EBCs at 1316° C. in 90% $H_2O$+$O_2$ (symbols). The oxidation kinetics of baseline EBC in air (solid line) is overlaid for comparison.
Figure 13:
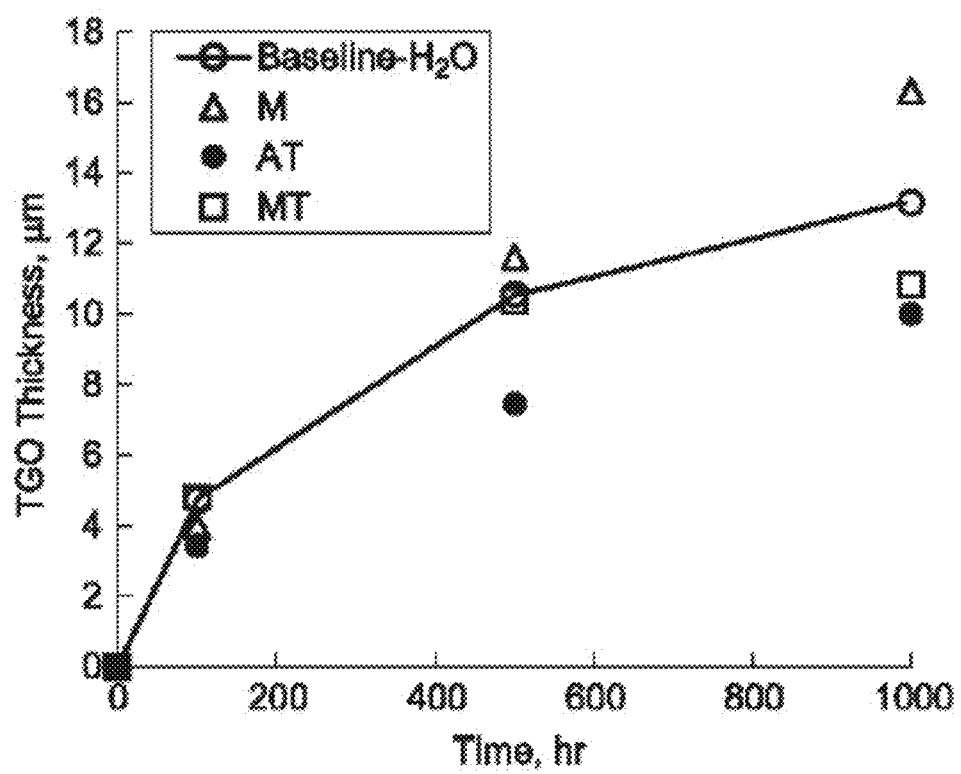
FIG. 13 is a plot of TGO thickness (µm) vs time (hours) for Group II (Table 3) modified EBCs at 1316° C. in 90% $H_2O$+$O_2$ (symbols). The oxidation kinetics of baseline EBC in 90% $H_2O$+$O_2$ (solid line) is overlaid for comparison.
Figure 14A:
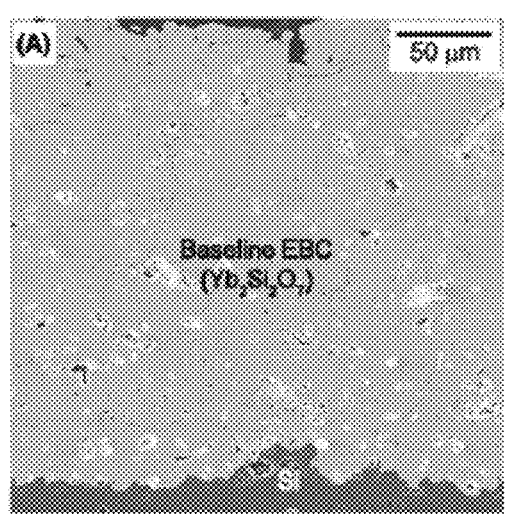
FIGS. 14A-14D are cross-sections of as-processed baseline EBC (FIG. 14A), Group I 6A (FIG. 14B) and M2Y (FIG. 14C), and group II, AT (FIG. 14D) at low magnification.
Figure 14B:
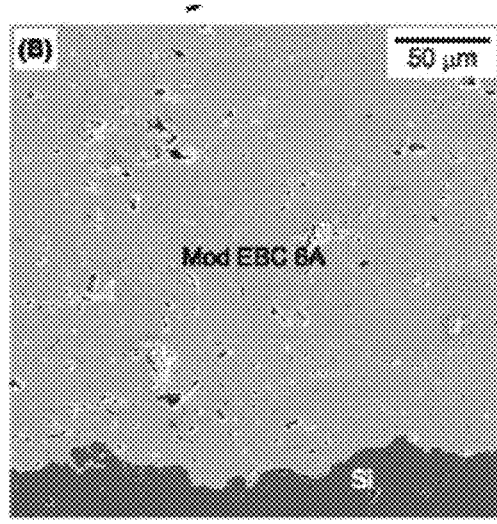
Figure 14C:
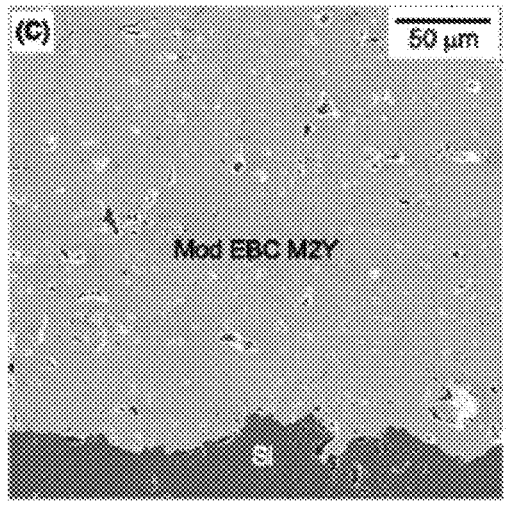
Figure 14D:
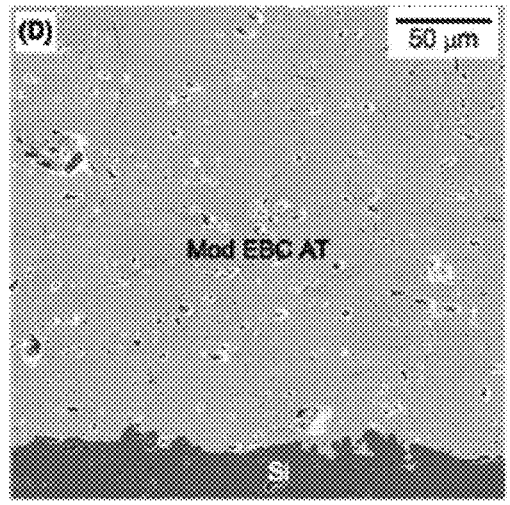
Figure 15A:
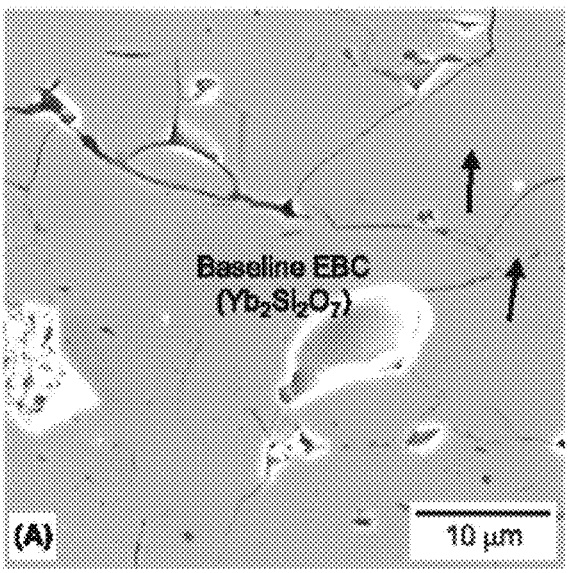
FIGS. 15A-15D are cross-sections of as-processed baseline EBC (FIG. 15A), Group I 6A (FIG. 15B) and M2Y (FIG. 15C), and group II, AT (FIG. 15D) at high magnification.
Figure 15B:
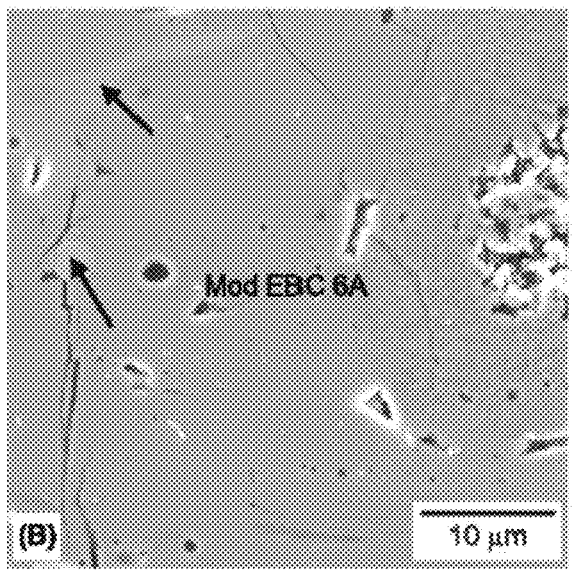
Figure 15C:
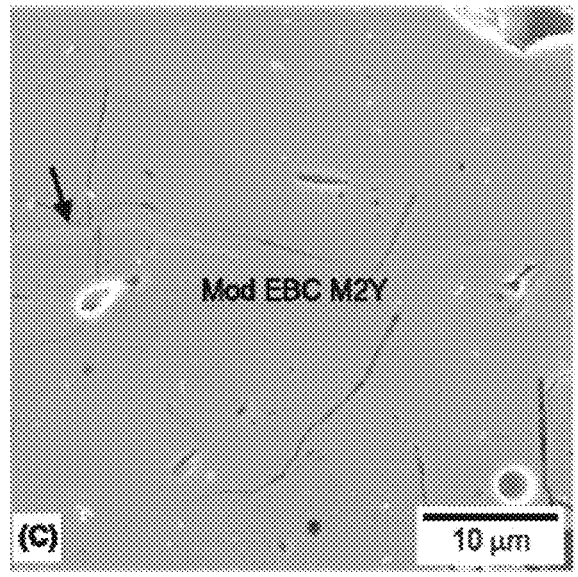
Figure 15D:
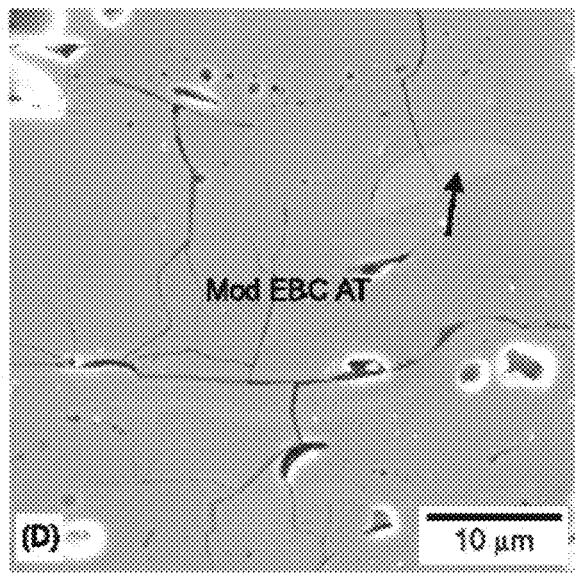

FIGS. 12 and 13 are plots of TGO thickness (μm) vs time (hours) for modified EBCs at 1316° C. in 90% $H_2O$+$O_2$. Modified EBCs are divided into two groups (Table 3): Group I (6A, M2Y, 3M, 2Y, M5Y) and Group II (M, AT, MT). Group I in water vapor (symbols in FIG. 12) exhibited dramatically reduced TGO growth rates compared with the baseline EBC in water vapor (solid line in FIG. 13). Group II in water vapor (symbols in FIG. 13) exhibited TGO growth rates comparable to that of baseline EBC in water vapor (solid line in FIG. 13). The TGO growth rates of Group I collectively in water vapor (symbols in FIG. 12) are comparable to that of baseline EBC in air (solid line in FIG. 12). The main difference in the modifier chemistry between the Group I and Group II is $TiO_2$ (Table 2). Both groups have at least one oxide containing $AlO_3$, i.e., mullite, $AlO_3$, or YAG, while Group II has $TiO_2$ in addition to either $AlO_3$ or mullite except for EBC M which has only 1.39% mullite modifier.

FIGS. 14A-14D and 15A-15D show the cross-sections of as-processed baseline EBC, Group I (6A, M2Y), and group II (AT) at low and high magnifications, respectively. All EBCs exhibited fairly similar microstructures, i.e., relatively low porosity visually (FIGS. 14A-14D) and some microcracks (FIGS. 15A-15D).

Figure 16:
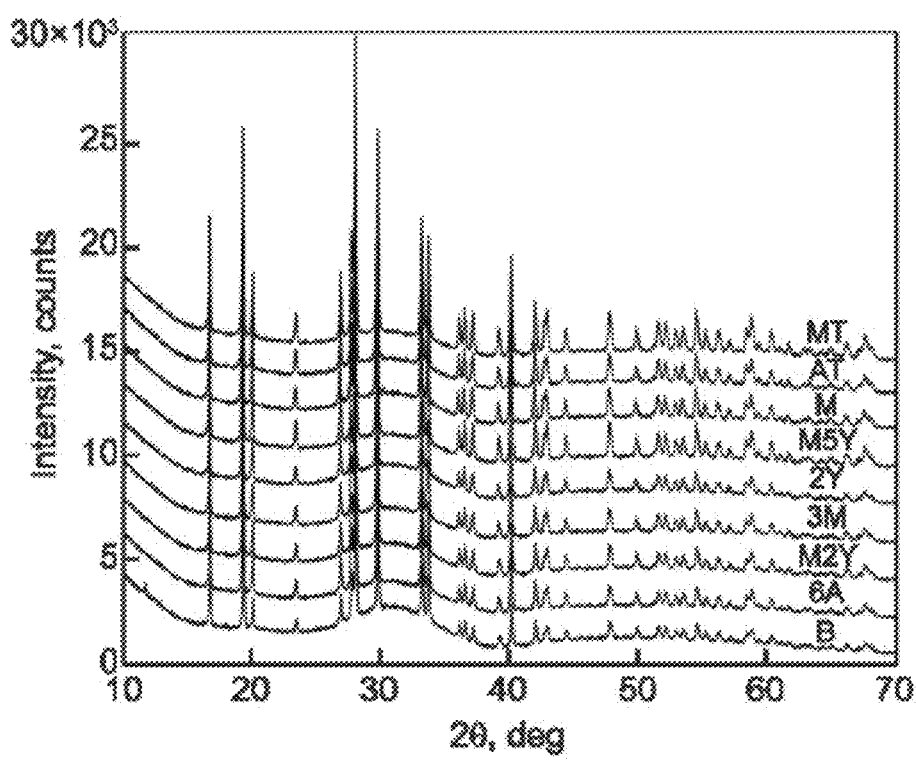
FIG. 16 is a graph of X-ray diffraction (XRD) patterns of as-processed EBCs.
Figure 17A:
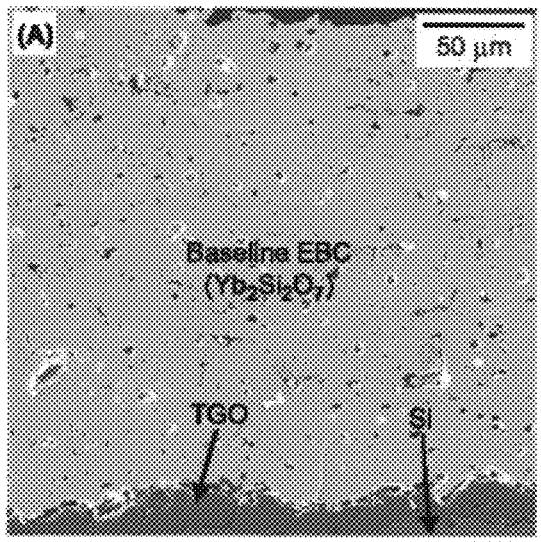
FIGS. 17A-17D are the cross-sections of baseline EBC (FIG. 17A), Group I-6A (FIG. 17B) and, M2Y(FIG. 17C), and Group II, AT (FIG. 17D) at low magnifications, respectively, after 1000 h/1000 cycles at 1316° C. in 90% $H_2O$+10% $O_2$.
Figure 17B:
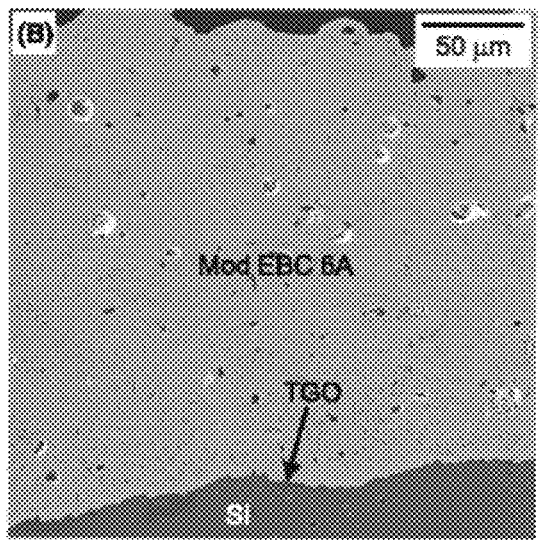
Figure 17C:
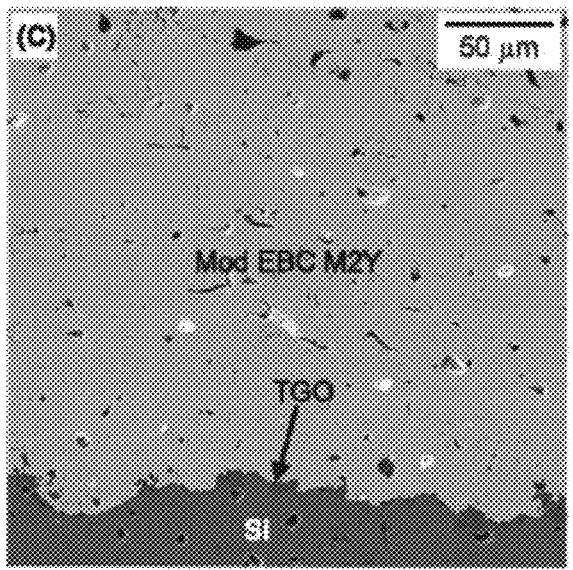
Figure 17D:
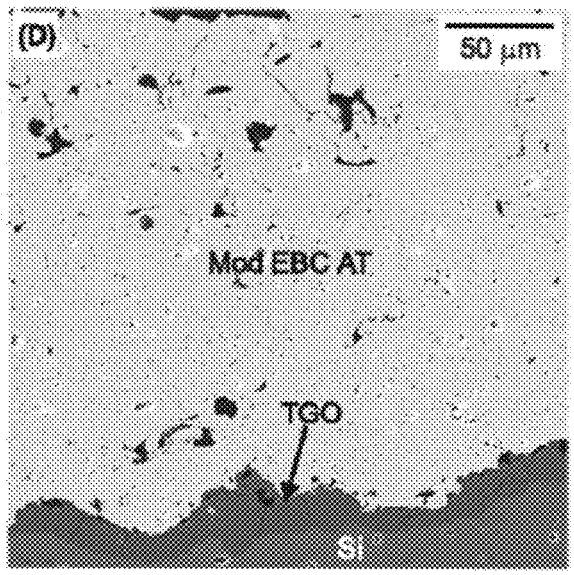

XRD patterns of all as-processed EBCs are identical (FIG. 16), i.e., crystalline $Yb_2Si_2O_7$, significant amount of amorphous phases as indicated by the hump at $2\theta=\sim25°\text{-}35°$, and no peaks associated with modifier oxides. The modifier oxides presumably deposited as amorphous phases due to the rapid quenching of molten droplets in plasma spraying process. The small peak in baseline EBC (B) at $2\theta=\sim12°$ could not be identified. Bright precipitates in FIGS. 15A-15D (arrows) have the chemistry of $Yb_2SiO_5$ according to EDS. $Yb_2SiO_5$ peaks, however, are absent in XRD patterns (FIG. 16), presumably because either the amount is below the detection limit or they are amorphous.

Low porosity is desirable from oxidation standpoint as it will lower oxidant permeation, however, some level of pores and microcracks are desirable from compliance standpoint. A high modulus due to low porosity can lead to EBC cracking and thermal and/or mechanical strain induced EBC failures. The optimum level of porosity depends on various factors such as coefficient of thermal expansion differences and intrinsic modulus.

Figure 18A:
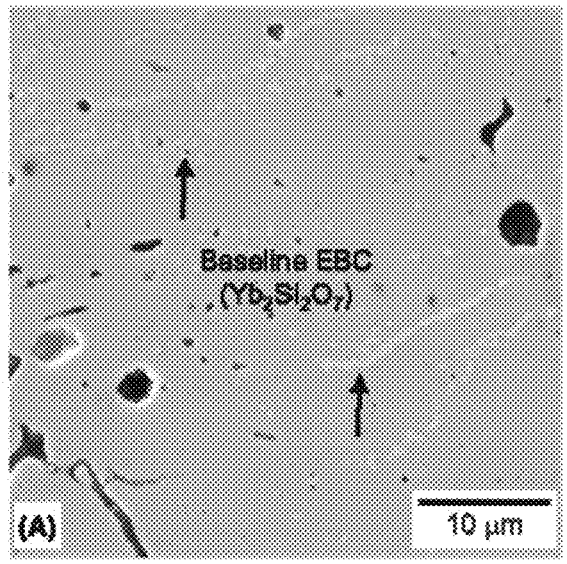
FIGS. 18A-18D are the cross-sections of baseline EBC (FIG. 18A), Group I-6A (FIG. 18B) and, M2Y (FIG. 18C), and Group II, AT (FIG. 18D) at high magnifications, respectively, after 1000 h/1000 cycles at 1316° C. in 90% $H_2O$+10% $O_2$.
Figure 18B:
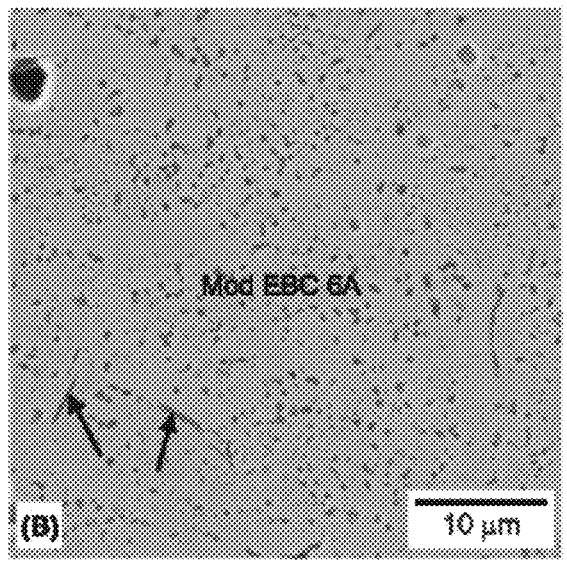
Figure 18C:
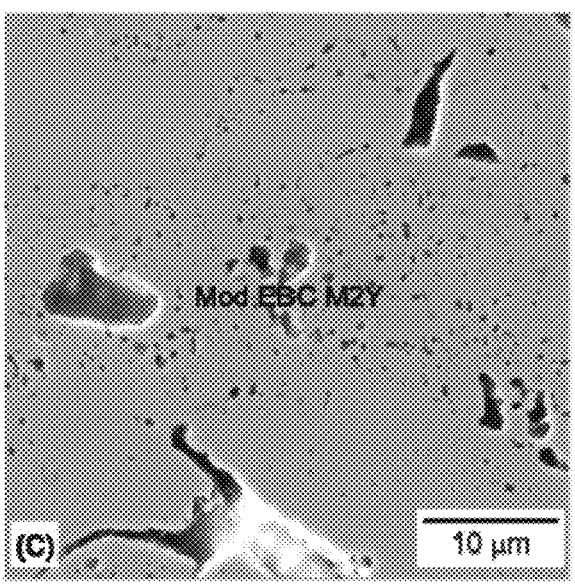
Figure 18D:
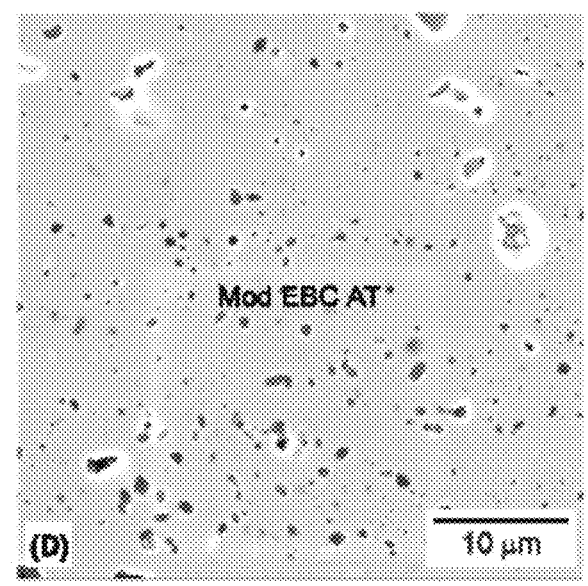

FIGS. 17A-17D and 18A-18D show the cross-sections of baseline EBC, Group I (6A, M2Y), and Group II (AT) at low and high magnifications, respectively, after 1000 h/1000 cycles at 1316° C. in 90% $H_2O$+10% $O_2$. A number of microstructural and chemical features stand out compared with as-processed EBC: (a) Microcracks were significantly reduced (Compare FIGS. 15A-D and 18A-D); (b) Precipitates with the $Yb_2SiO_5$ chemistry disappeared from all modified EBCs (FIGS. 18B-D) while they were retained in baseline EBC (arrows in FIG. 18A); (c) Small dark gray speckles appeared in all modified EBCs (FIGS. 18B-D); (d) Needlelike dark gray precipitates appeared in EBC 6A (arrows in FIG. 18B; also see FIGS. 22A,B); (e) Ti-containing precipitates appeared in EBC AT (not shown in FIG. 18D due to the lack of contrast); (f) TGO grew at various rates as plotted in FIG. 12 and FIG. 13 (FIGS. 17A-D). The microstructural and chemical features in Group I (6A, M2Y) after 500 h/500 cycles are similar to those after 1000 h/1000 cycles described above.

The other Group I (3M, 2Y, M5Y) shows microstructural and chemical features similar to Group I (6A, M2Y) discussed above. Group TI (MT) shows microstructural and chemical features similar to Group TI (AT).

Unlike the disruptive phase transformation of amorphous phase in conventionally plasma-sprayed mullite in thermal exposure and the resulting detrimental cracking behavior, the crystallization of amorphous phases does not lead to EBC cracking (FIGS. 17A-17D and 18A-18D). On the contrary, even the microcracks that were present in the as-processed EBCs (FIGS. 15A-15D) mostly disappeared after as early as 100 hours exposure.

Figure 19:
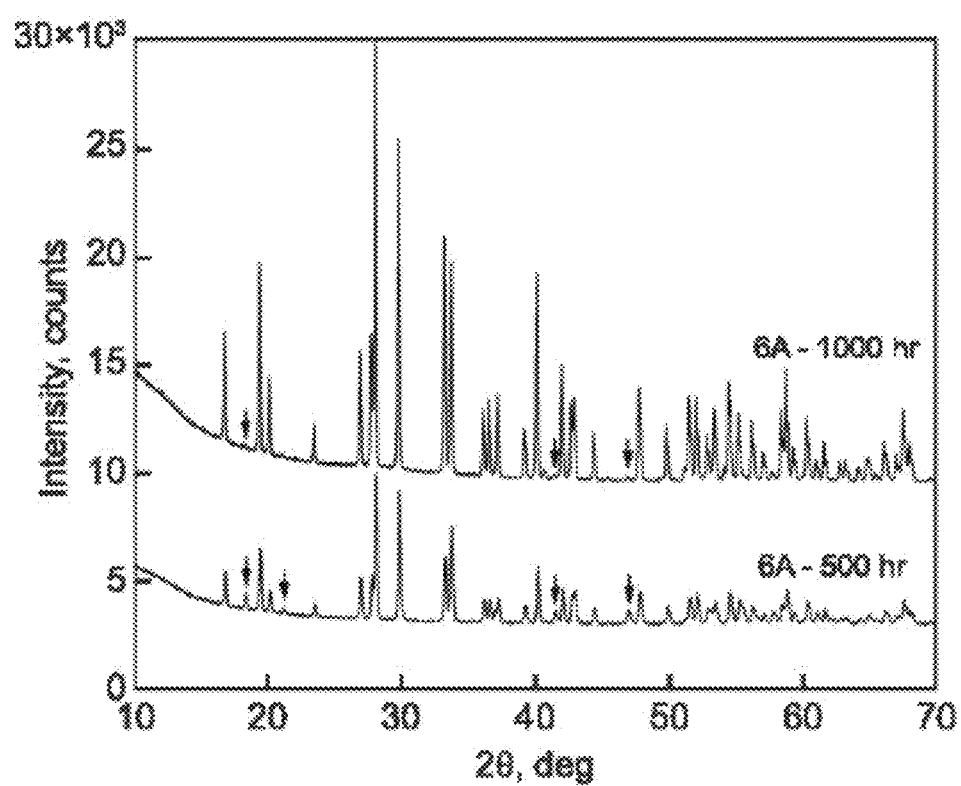
FIG. 19 is a graph of X-ray diffraction (XRD) patterns of EBC 6A ($Yb_2Si_2O_7$+6% $Al_2O_3$) after 500 h/500 cycles and 1000 hr/1000 cycles. The peaks marked with arrows match those of $Yb_3Al_5O_{12}$ (YbAG).
Figure 20:
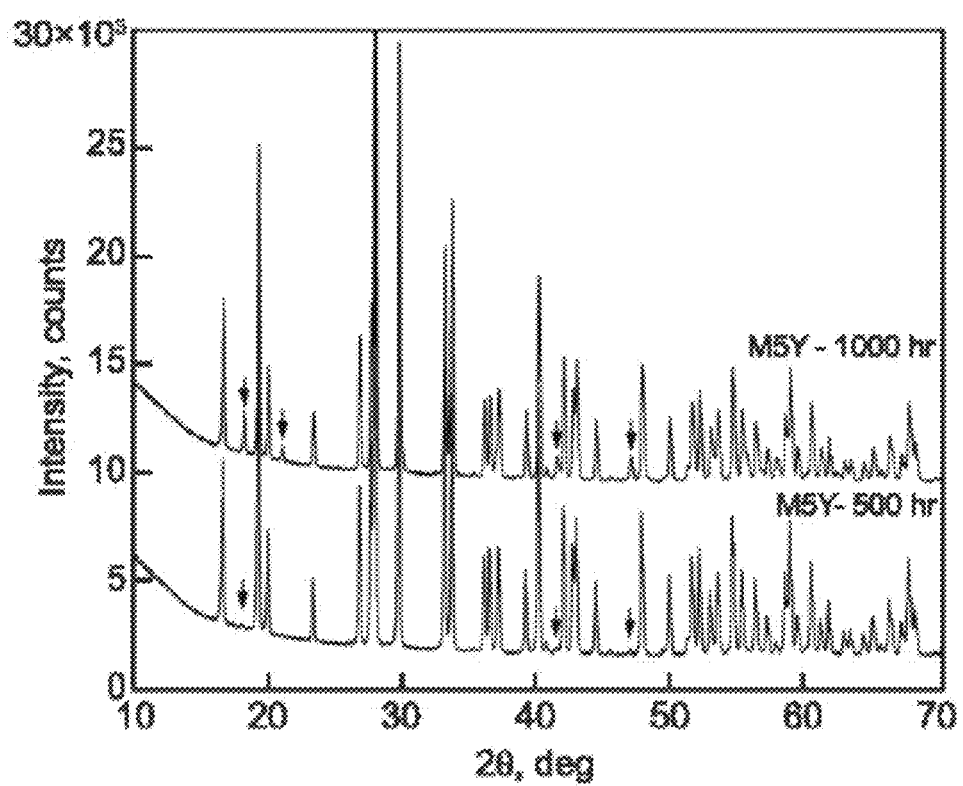
FIG. 20 is a graph of X-ray diffraction (XRD) patterns of EBC M5Y ($Yb_2Si_2O_7$+1.39% mullite+4.66% YAG) after 500 h/500 cycles and 1000 hr/1000 cycles. The peaks marked with arrows match those of $Y_3Al_5O_{12}$ (YAG).
Figure 21:
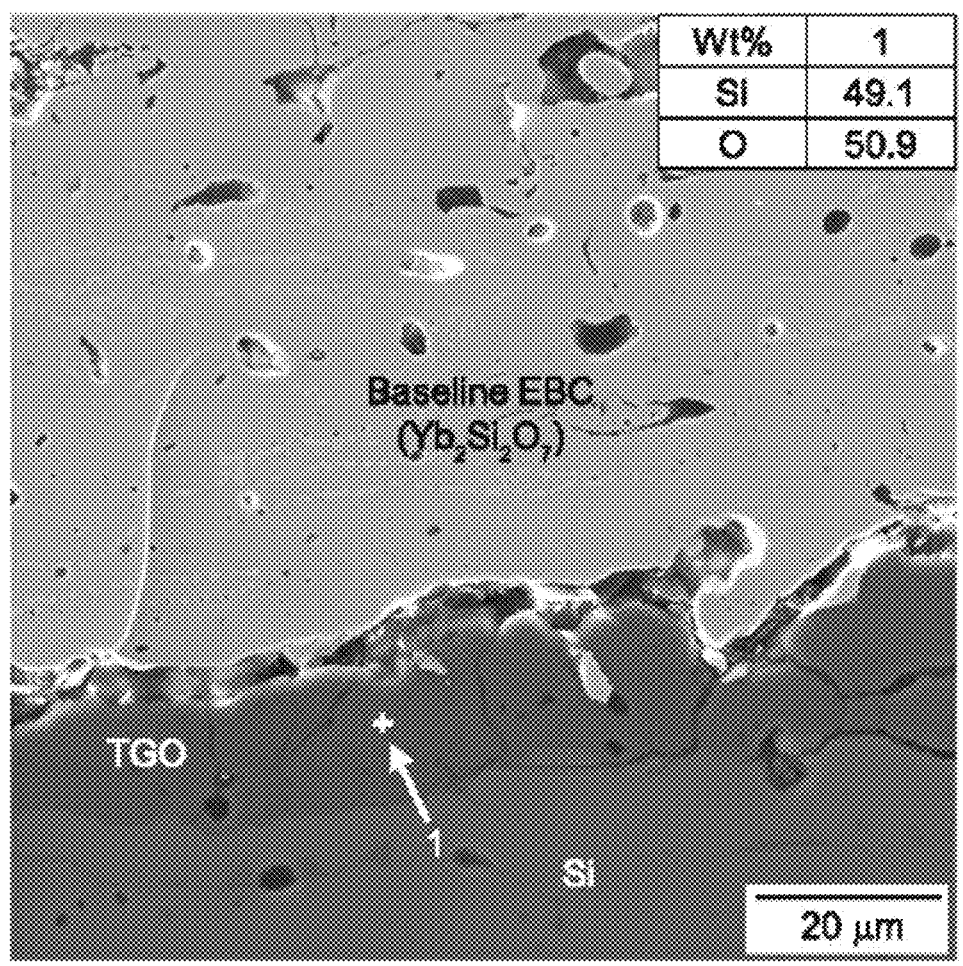
FIG. 21 is an image of the TGO cross-section and EDS analysis of baseline EBC after 1000 hr/1000 cycles at 1316° C. in 90% $H_2O$+10% $O_2$.

The small dark gray speckles in all modified EBCs (FIGS. 18B-D) were analyzed by EDS. These speckles contain various levels of Yb, Si, Al, Ti, and O, indicating they are Yb—Al-silicates or Yb—Al—Ti silicates. Needle-like dark gray precipitates in EBC 6A (arrows in FIG. 18B) also contain Yb and Al. FIG. 19 shows XRD patterns of EBC 6A after 500 h/500 cycles and 1000 h/1000 cycles. The peaks marked with arrows match those of $Yb_3Al_5O_{12}$. Interestingly $Yb_3Al_5O_{12}$ peaks are stronger at 500 hours than at 1000 hours. FIG. 20 shows XRD patterns of EBC M5Y after 500 h/500 cycles and 1000 h/1000 cycles. The peaks marked with arrows match those of $Yb_3Al_5O_{12}$ (YAG). XRD patterns of EBC MT after 500 hours and 1000 hours showed the strongest peak of $TiO_2$ (anataze). The other modified EBCs did not show any peaks for $Yb_3Al_5O_{12}$ or YAG although they all contain oxides that could form $Yb_3Al_5O_{12}$ or YAG. It is possible that $Yb_3Al_5O_{12}$ or YAG are also present in the other modified EBCs, but the amount is below the detection limit FIG. 21 shows the TGO cross-section and EDS analysis of baseline EBC after 1000 h/1000 cycles at 1316° C. in 90% $H_2O$+10% $O_2$. The TGO is pure silica. Severe cracking, predominantly horizontal as well as segmental, occurred in and around the TGO. The most severe cracks run horizontally along the $Yb_2Si_2O_7$/TGO interface, indicating spallation is imminent along the $Yb_2Si_2O_7$/TGO interface. The cracking indicates that the TGO is likely cristobalite. The location of cracks is similar to the location of horizontal cracks along the (mullite+BSAS)/$SiO_2$ interface as described in the Solar Turbines engine test of Kimmel, et al., ASME paper GO2003-38920, ASME TURBO EXPO, Atlanta, Ga. (June 2003), which is incorporated by reference herein in its entirety. Early tests during the development of the baseline EBC, showed spallation occurred at the $Yb_2Si_2O_7$/TGO interface at TGO thickness of 20-25 µm at <1000 hours under the same testing condition. The average TGO thickness of baseline EBC at 1000 hours in this later study was found to be 13.2±3.9 µm. (Table 3). Possible factors contributing to the disparity in the TGO growth rate between later studies and the early study include spray parameters, spray powders, and batch to batch variations.

TABLE 3

TGO thickness (µm) of baseline and modified EBCs in 90% $H_2O + O_2$ at 1316° C. in thermal cycling

| EBC Group | EBC ID | Environment | 100 h AVG[a] | 100 h SD[b] | 500 h AVG[a] | 500 h SD[b] | 1000 h AVG[a] | 1000 h SD[b] |
|---|---|---|---|---|---|---|---|---|
| Baseline | B | Air | 0.8 | 0.2 | 2.0 | | 0.3 | 0.5 |
| | | Stream | 4.7 | 0.8 | 10.6 | 2.7 | 13.2 | 3.9 |
| I | 6A | Stream | 0.2 | 0.1 | 1.3 | 1.0 | 1.9 | 0.8 |
| | M2Y | | 1.0 | 0.4 | 1.4 | 0.2 | 1.7 | 0.5 |
| | 3M | | 1.4 | 0.7 | 1.4 | 1.2 | 2.5 | 2.1 |
| | 2Y | | 1.5 | 0.9 | 3.7 | 1.1 | 3.7 | 1.6 |
| | M5Y | | 0.8 | 0.3 | 1.3 | 0.3 | 2.4 | 0.6 |
| II | M | | 4.0 | 1.0 | 11.6 | 1.7 | 16.3 | 5.4 |
| | AT | | 3.4 | 0.7 | 7.4 | 2.5 | 10.0 | 2.6 |
| | MT | | 4.8 | 1.3 | 10.8 | 1.3 | 10.8 | 0.9 |

[a]Average.
[b]Standard deviation.

Figure 22A:
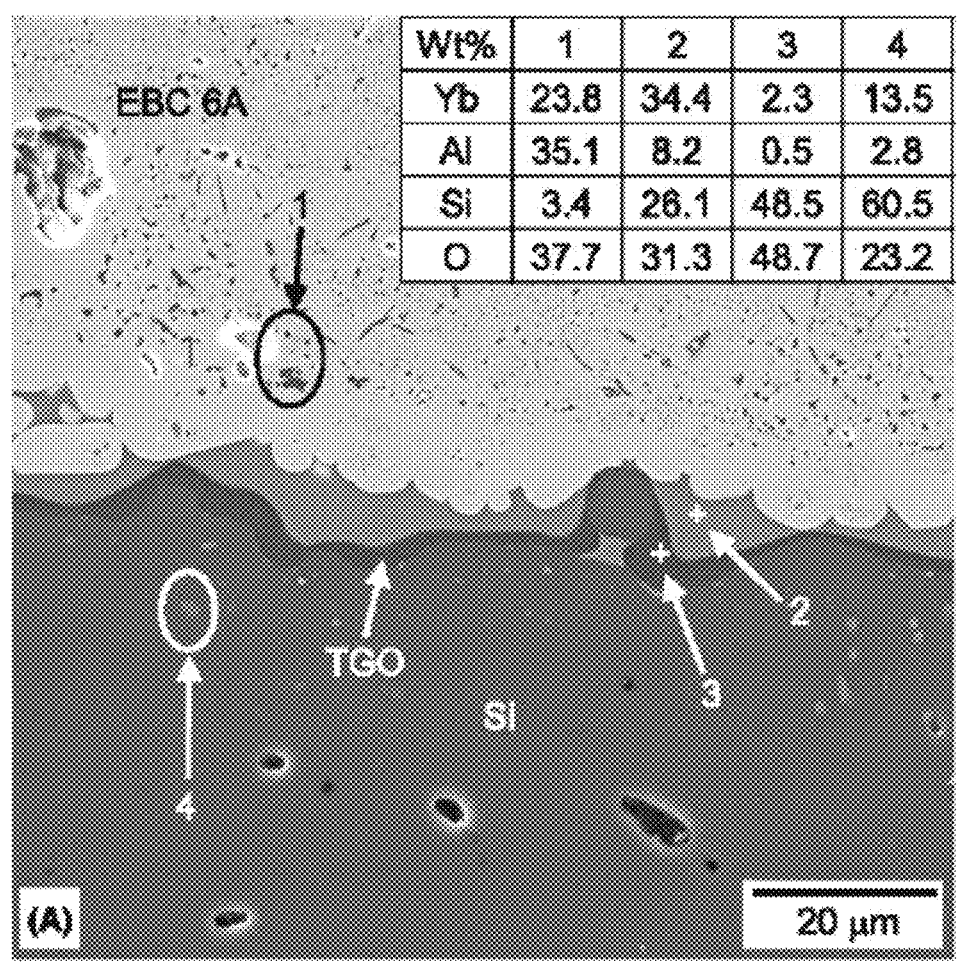
FIGS. 22A and 22B is an image of TGO cross-section of EBC 6A (Si/$Yb_2Si_2O_7$+6% $Al_2O_3$) at 1316° C. in 90% $H_2O$+10% $O_2$ after 500 h/500 cycles (FIG. 22A) and 1000 hr/1000 cycles (FIG. 22B).
Figure 22B:
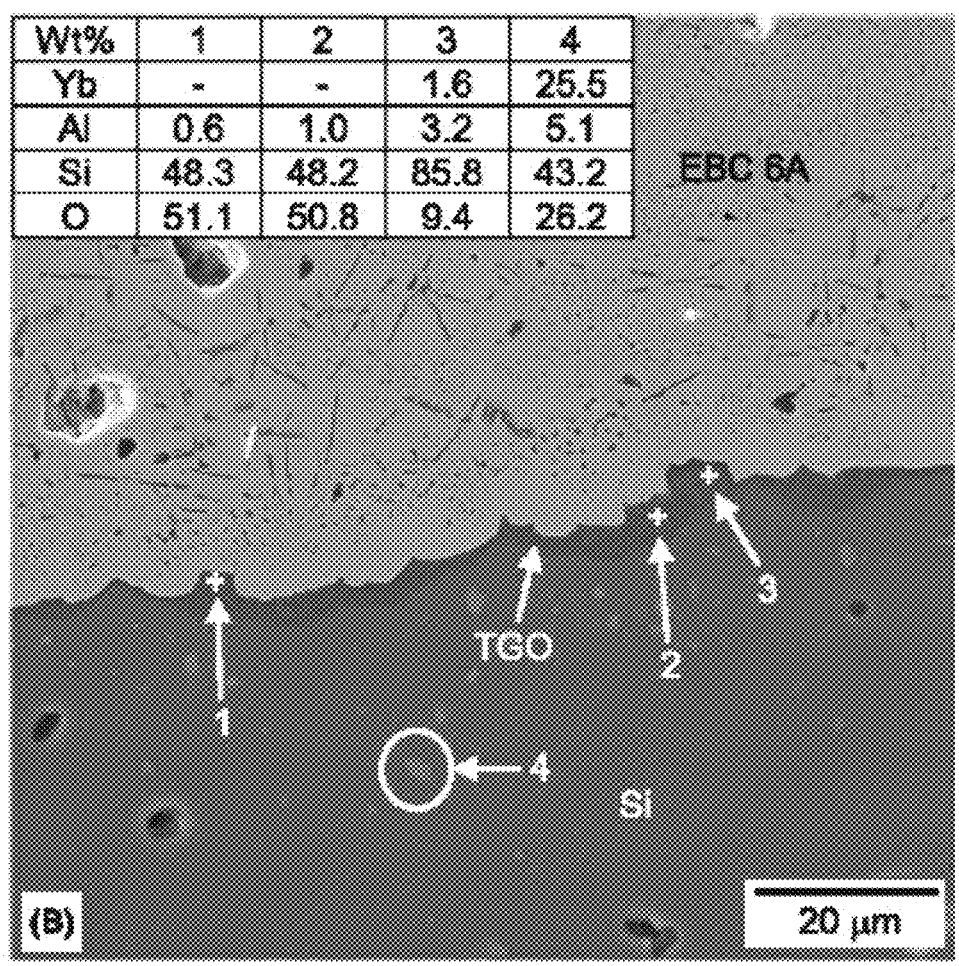

FIGS. 22A and 22B show the TGO cross-sections and EDS analysis of EBC 6A after 500 h/500 cycles and 1000 h/1000 cycles, respectively, at 1316° C. in 90% $H_2O$+10% $O_2$. Points #1, #2, and #4 in FIG. 22A and point #4 in FIG. 22B are Yb—Al-silicates. A continuous light gray layer of Yb—Al-silicate (point 2 in FIG. 22A) appeared between the TGO and $Yb_2Si_2O_7$ at 100 hours (photo not shown) and 500 hours. This is attributed to the high level of $Al_2O_3$ (6 wt. %) in the modifier. The continuous Yb—Al-silicate layer, however, disappeared after 1000 hours (FIG. 22B). The appearance of Yb—Al-silicate precipitates in the Si bond coat (point 4 in FIG. 22A, point 4 in FIG. 22B, and point 6 in FIG. 23) indicates that Yb—Al-silicates migrated from the modified $Yb_2Si_2O_7$ to the Si bond coat by passing through the TGO. Yb—Al-silicate precipitates in the Si bond coat were most pronounced in modified EBCs with high levels of $Al_2O_3$(EBCs 6A and M5Y). TGO on EBC 6A contained about 0.5%-3% Al and up to ~2% Yb. The average TGO thickness at 1000 hours was 1.9±0.8 µm (Table 3). No cracking in the TGO suggests it may be amorphous.

Figure 23:
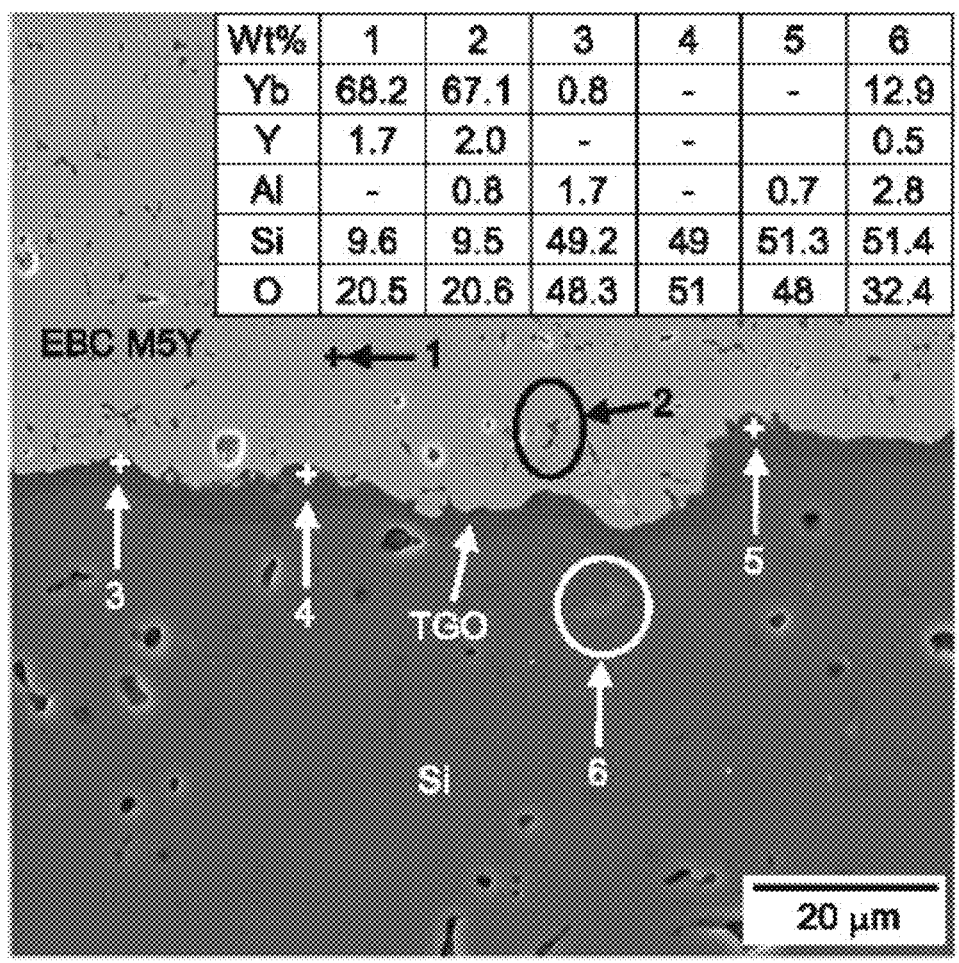
FIG. 23 is an image of TGO cross-section and EDS chemical analysis of EBC M5Y (Si/$Yb_2Si_2O_7$+1.39% mullite+4.66% YAG) after 1000 hr/1000 cycles at 1316° C. in 90% $H_2O$+10% $O_2$.

FIG. 23 shows the TGO cross-section and EDS analysis of EBC M5Y after 1000 h/1000 cycles at 1316° C. in 90%

$H_2O+10\%$ $O_2$. A small amount of Y was detected in $Yb_2Si_2O_7$ (e.g., point 1). Similar to EBC 6A (FIGS. 22A and 22B), Yb—Al-silicate precipitates appeared in the $Yb_2Si_2O_7$ top coat (point 2) and Si bond coat (point 6), which also contained a small amount of Y. Similar to EBC 6A TGO contained about 0.5%-3% Al and up to ~1% Yb. The average TGO thickness at 1000 hours was 2.4±0.6 μm (Table 3). No cracking in the TGO suggests it may be amorphous.

Figure 24:
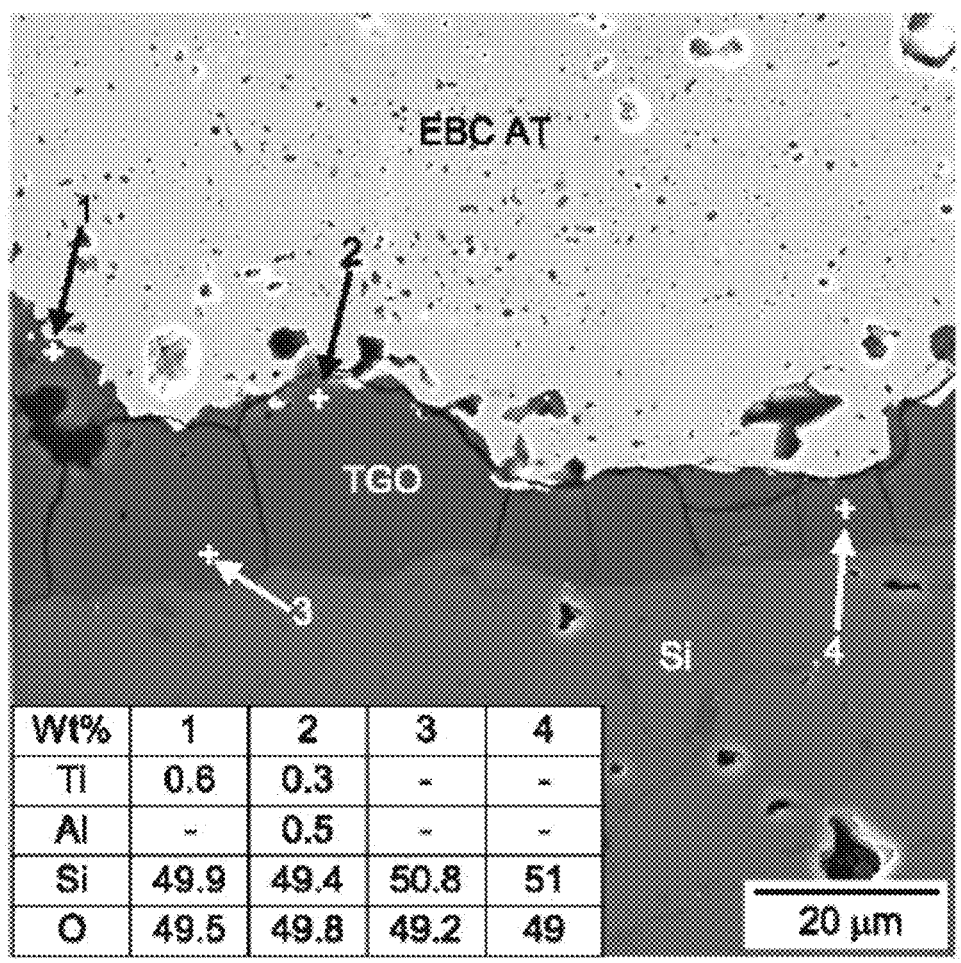
FIG. 24 is an image of TGO cross-section and EDS chemical analysis of EBC AT (Si/$Yb_2Si_2O_7$+1% $Al_2O_3$+1% $TiO_2$) after 1000 hr/1000 cycles at 1316° C. in 90% $H_2O$+10% $O_2$.

FIG. 24 shows the TGO cross-section and EDS analysis of EBC AT after 1000 h/1000 cycles at 1316° C. in 90% $H_2O+10\%3$ $O_2$. A small amount of Ti and/or Al was detected in the TGO near the $Yb_2Si_2O_7$/TGO interface (points #1 and #2 in FIG. 24). Similar to baseline EBC (FIG. 21) severe cracking, predominantly horizontal as well as segmental, occurred in and around the TGO. The average TGO thickness at 1000 hours was 10.0±2.6 μm (Table 3). The cracking indicates that the TGO is likely cristobalite.

The parabolic oxidation law states:

$$x^2 = kt \quad (1)$$

$$x = (k)^{0.5}(t)^{0.5} \quad (2)$$

where x=TGO thickness (μm). k=rate constant (μm²/h), and t=time (hours). According to Equation 2 TGO thickness scales with $(k)^{0.5}$ for a fixed time. Since the parabolic rate constant of Si in 90% $H_2O+10\%$ $O_2$ is 64× greater than that of Si in 21% $O_2$ (1.017/0.016=64) the TGO is 8.1× thicker in 90% $H_2O+10\%$ $O_2$ than in 21% $O_2$ ($64^{0.5}$=8.1). This is attributed to the higher permeability of $H_2O$ in $SiO_2$, which is ~10× higher than that of $O_2$.

In water vapor, the parabolic rate constant of Si is about 5.8× higher than that of baseline EBC (1.07/0.184=5.8). Therefore, the TGO on uncoated Si is 2.4× thicker than the TGO on baseline EBC ($5.8^{0.5}$=2.4). This translates to 58% reduction in oxidant permeation due to the presence of baseline EBC (100(2.4−1)/2.4=58%).

The parabolic rate constant of baseline EBC in 90% $H_2O+10\%$ $O_2$ is 18.4× greater than that of baseline EBC in air (0.184/0.01=18.4). Therefore, the TGO on baseline EBC is 4.3× thicker in 90% $H_2O+10\%$ $O_2$ than in air ($18.4^{0.5}$=4.3). This implies that water vapor contributes to 76.7% of TGO growth in 90% $H_2O+10\%$ $O_2$ (100(4.3−1)/4.3=76.7%). This is why water vapor is so critical to oxidation studies of EBCs for gas turbine applications.

Thermally grown oxide growth rates of Group I collectively in 90% $H_2O+10\%$ $O_2$ are comparable to that of baseline EBC in air (FIG. 12). In fact, many of the Group I TGO thicknesses (symbols in FIG. 12) are thinner than that of the baseline EBC in air (solid line in FIG. 12). As such the parabolic rate constant of baseline EBC in air (0.01 μm²/h) can be used as a conservative approximation of parabolic rate constant for Group I collectively in 90% $H_2O+10\%$ $O_2$. Therefore, in 90% $H_2O+10\%$ $O_2$ the parabolic rate constant of baseline EBC is ~20× higher than that of Group I collectively (0.184/0.01=18.4). This implies that Group I collectively reduced the TGO thickness by ~80% compared with the baseline EBC in 90% $H_2O+10\%$ $O_2$ at 1316° C. ($100(0.184^{0.5}-0.01^{0.5})/0.184^{0.5} \approx 80\%$). Individually the TGO thickness reduction by EBC M2Y, which shows the thinnest TGO at 1000 hours in 90% $H_2O+10\%$ $O_2$ at 1316° C., is 87% (100 (13.2−1.7)/13.2=87%) (Table 3).

Based on these results and an assumption that the parabolic oxidation rate constants based on 1000 hours steam oxidation data are maintained for the life of EBCs and that the critical TGO thickness at which EBC fails by spallation is the same for baseline and modified EBCs, the improved oxidation life by Group A can be estimated as follows.

$$x^2_{(cr)} = kt_{(life)} \quad (3)$$

$$t_{(life)} = x^2_{(cr)}/k \quad (4)$$

where $x_{(cr)}$=critical TGO thickness at failure (μm), k=rate constant (μm²/h), and $t_{(life)}$=time at EBC failure (hours), i.e., EBC life. According to Equation 4, EBC life ($t_{(life)}$) scales with 1/k for a fixed $x_{(cr)}$. In 90% $H_2O+10\%$ $O_2$, Group I collectively, therefore, have ~20× longer life than the baseline EBC (0.184/0.01=18.4). Individually EBC M2Y has ~60× longer life than the baseline EBC in 90% $H_2O+10\%$ $O_2$ ((13.2/1.72=59) (Table 3).

All as-processed EBCs showed relatively low porosity visually with some microcracks. A small amount of precipitates with the $Yb_2SiO_5$ chemistry were detected in all as-processed EBCs by EDS. Upon oxidation exposures microcracks were significantly reduced in all EBCs, precipitates with the $Yb_2SiO_5$ chemistry disappeared from all modified EBCs, and a small amount of Yb—Al-silicate or Yb—Al—Ti silicate precipitates appeared on all modified EBCs. Without being bound by theory, it is believed that precipitates with the $Yb_2SiO_5$ chemistry transformed to $Yb_2Si_2O_7$ as it reacted with modifier oxides to form Yb—Al-silicates or Yb—Al—Ti-silicates. The disappearance of microcracks from all EBCs is attributed to the sintering of $Yb_2Si_2O_7$ during oxidation exposures. It is quite possible that Yb—Al-silicates or Yb—Al—Ti-silicates accelerated the sintering of $Yb_2Si_2O_7$ and thereby further reduced the oxidants permeability of modified $Yb_2Si_2O_7$ compared with the baseline $Yb_2Si_2O_7$. The formation of $Yb_3Al_5O_{12}$ in EBC 6A is due to the reaction of $Al_2O_3$ and $Yb_2Si_2O_7$ and is attributed to the high level of $Al_2O_3$ in the modifier (6%).

If the permeation of oxidants through the modified $Yb_2Si_2O_7$ controlled the TGO growth rates TGO growth rates would be linear. The fact that the TGO thickness vs time plot looks similar to parabolic oxidation (FIG. 12) indicates that the permeation of oxidants through the modified $Yb_2Si_2O_7$ did not control the TGO growth rates unless the permeability continued to decrease out to 1000 hours via continuous sintering. The microstructures of modified EBCs, however, did not appear to have changed much between 500 hours and 1000 hours. Another argument against modified $Yb_2Si_2O_7$ permeability-controlled oxidation is that Yb—Al—Ti silicates in Group II (AT, MT) may be as effective as sintering aids as Yb—Al silicates in Group I. These Group II Yb—Al—Ti silicates, however, showed only a slight reduction in oxidation rates after 1000 hours (Table 3), which could be due to batch to batch variations. It is, therefore, hypothesized that the oxidants permeation through TGO controlled the TGO growth rates.

The modifiers were divided into two groups according to the oxidation rates (Table 2): Modifier I (6% $Al_2O_3$, 1.39% mullite+4.66% YAG, 1.39% mullite+2.33% YAG, 2.78% mullite, 2.33% YAG); and Modifier II (1.39% mullite, 1% $Al_2O_3$+1% $TiO_2$, 1.39% mullite+1% $TiO_2$). $Al_2O_3$ is the only common oxide in Modifier I, while both $Al_2O_3$ and $TiO_2$ are present in Modifier II except for the 1.39% mullite modifier. About 0.5%-3% Al and up to 1%-2% Yb were detected in the TGO of EBCs with Modifier I (6% $Al_2O_3$, 1.39% mullite+4.66% YAG), while no Al or Yb was detected in the TGO of EBCs with Modifier I (1.39% mullite+2.33% YAG, 2.78% mullite, 2.33% YAG). The nondetection of Al in the TGO of EBCs with Modifier I (1.39% mullite+2.33% YAG, 2.78% mullite, 2.33% YAG) and Modifier II (1.39% mullite) may be because the Al concentration was below the EDS detection limit. Both Al and Ti were detected in the TGO of EBCs with modifier II (1% $Al_2O_3$+1% $TiO_2$) and only Ti was detected in the TGO of EBC with modifier II (1.39% mullite+1% $TiO_2$).

The main difference between Modifier I and Modifier II is the presence of $TiO_2$ in the Modifier II with the exception of the 1.39% mullite modifier. Without being bound by theory, It is that Al in combination with Yb in TGO is the main contributor to the reduced TGO growth rates of Group I, while Ti negates the benefits of Al in Group II (AT and MT). It is also proposed that there is a minimum level of Al required even in the absence of Ti, considering that the 1.39% mullite modifier even in the absence of $TiO_2$ did not provide reduced oxidation.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of fabricating a slurry environmental barrier coating system comprising:
   fabricating a bond coat comprising:
   preparing a mixture comprising:
      a bond-coat coating material comprising 70 wt %-99 wt % mullite,
      a primary sintering aid comprising 0.1 wt % to 30 wt % Si,
      at least one secondary sintering aid selected from 0.1 wt % to 20 wt % $RE_2Si_2O_7$, 0.1 wt % to 20 wt % $Yb_2Si_2O_7$, 0.1 wt % to 20 wt % YAG ($Y_3Al_5O_{12}$), 0.1 wt % to 20 wt % YbAG ($Yb_3Al_5O_{12}$), 0.1 wt % to 20 wt % $A_{l2}O_3$, and 0.1 wt % to 20 wt % $TiO_2$, or any combination of two or more thereof, and
      a first solvent;
   milling the mixture in a milling media to form a first slurry;
   filtering and drying the first slurry to form a powder of the bond-coat coating material, the primary sintering aid, and the at least one secondary sintering aid;
   mixing the powder with a solution comprising a second solvent and an organic processing aid and milling the resulting mixture to form a second slurry; and
   applying the second slurry to a substrate to form the bond coat layer.

2. The method of claim 1, wherein the method further comprises:
   fabricating a first top coat layer comprising:
   preparing a mixture comprising:
      a first-top-coat coating material comprising 80 wt %-99 wt % $HfSiO_4$,
      a primary sintering aid comprising 1 wt % to 20 wt % Si, and
      a first solvent;
   milling the mixture in a milling media to form a third slurry;
   filtering and drying the third slurry to form a powder of the first-top-coat coating material and the primary sintering aid;
   mixing the milled powder with a solution comprising a second solvent and an organic processing aid and milling the resulting mixture to form a fourth slurry; and
   applying the fourth slurry to the bond coat layer to form the first top coat layer; and fabricating a second top coat layer comprising:
   preparing a mixture comprising:
      a second-top-coat coating material comprising 70 wt %-99.9 wt % $RE_2Si_2O_7$,
      a primary sintering aid comprising 0.1 wt % to 10 wt % mullite, and a solvent;
   milling the mixture in a milling media to form a fifth slurry;
   filtering and drying the fifth slurry to form a powder of the second-top-coat coating material and the primary sintering aid;
   mixing the powder with a solution comprising a second solvent and an organic processing aid and milling the resulting mixture to form a sixth slurry; and
   applying the sixth slurry to the first top coat layer to form the second top coat layer.

3. The method of claim 2, wherein the method further comprises fabricating at least one outer top coat layer comprising an outer-top-coat coating material comprising $RE_2SiO_5$, $RE_2O_3$, or stabilized $ZrO_2$ and/or stabilized $HfO_2$, wherein the at least one outer top coat layer is applied to the second top coat layer.

4. The method of claim 2, wherein (1) the third slurry of the first top coat layer further comprises a secondary sintering aid selected from 0.1 wt % to 20 wt % mullite, 0.1 wt % to 20 wt % YAG ($Y_3Al_5O_{12}$), 0.1 wt % to 20 wt % YbAG ($Yb_3Al_5O_{12}$), 0.1 wt % to 20 wt % $Yb_2Si_2O_7$, 0.1 wt % to 20 wt % $Y_2Si_2O_7$, 0.1 wt % to 20 wt % $Al_2O_3$, and 0.1 wt % to 20 wt % $TiO_2$, or any combination of two or more thereof and (2) the fifth slurry of the second top coat layer further comprises 0.1 wt % to 20 wt % YAG ($Y_3Al_5O_{12}$), 0.1 wt % to 20 wt % YbAG ($Yb_3Al_5O_{12}$), 0.1 wt % to 20 wt % $Al_2O_3$, and 0.1 wt % to 20 wt % $TiO_2$, or any combination of two or more thereof.

5. The method of claim 2, wherein the second solvent for any layer is an alcohol selected from ethanol, methanol, ethyl alcohol, or a combination thereof.

6. The method of either claim 1 or 2, wherein the organic processing aid comprises:
   a dispersant selected from polyethyleneimine (PEI), polyacrylic acid (PAA), ammonium polyacrylate, or a combination thereof and a binder selected from polyvinylbutyral (PVB) and polyvinylpyrollidone (PVP).

7. The method of claim 2, wherein application of any of the layers is done by dipping, spinning, spin-dipping, painting, or spraying.

8. The method of claim 2, wherein each of the bond coat layer, the first top coat layer, and the second top coat layer are further processed by drying, binder burn-out, and sintering.

9. The method of claim 8, wherein the further processing is done after each layer is applied.

10. The method of claim 1, wherein the at least one secondary sintering aid is 0.1 wt % to 20 wt % $Yb_2Si_2O_7$.

11. A method of fabricating a slurry environmental barrier coating system comprising:
   fabricating a bond coat comprising:
   preparing a mixture comprising:
      a bond-coat coating material comprising 70 wt %-99 wt % $RE_2Si_2O_7$, a primary sintering aid comprising 1 wt % to 30 wt % Si, at least one secondary sintering aid selected from 0.1 to 20 wt % mullite, 0.1 wt % to 20 wt % YAG ($Y_3Al_5O_{12}$), 0.1 wt % to 20 wt % YbAG ($Yb_3Al_5O_{12}$), 0.1 wt % to 20 wt % $Al_2O_3$, and 0.1 wt % to 20 wt % $TiO_2$, or any combination of two or more thereof, and a first solvent;

milling the mixture in a milling media to form a first slurry;

filtering and drying the first slurry to form a powder of the bond-coat coating material and the primary sintering aid;

mixing the powder with a solution comprising a second solvent and an organic processing aid and milling the resulting mixture to form a second slurry; and applying the second slurry to a substrate to form the bond coat layer.

12. The method of claim 11, wherein the method further comprises:

fabricating a top coat layer comprising:

preparing a mixture comprising:

a top-coat coating material comprising 70 wt %-99.9 wt % $RE_2Si_2O_7$, a primary sintering aid comprising 0.1 wt % to 10 wt % mullite, and a first solvent;

milling the mixture in a milling media to form a third slurry;

filtering and drying the third slurry to form a powder of the top-coat coating material and the primary sintering aid;

mixing the milled powder with a solution comprising a second solvent and an organic processing aid and milling the resulting mixture to form a fourth slurry; and applying the fourth slurry to the bond coat layer to form the top coat layer.

13. The method of claim 12, wherein the method further comprises fabricating at least one outer top coat layer comprising an outer-top-coat coating material comprising $RE_2SiO_5$, $RE_2O_3$, or stabilized $ZrO_2$ and/or stabilized $HfO_2$, wherein the at least one outer top coat layer is applied to the top coat layer.

14. The method of claim 12, wherein the third slurry of the top coat layer further comprises 0.1 wt % to 20 wt % YAG ($Y_3Al_5O_{12}$), 0.1 wt % to 20 wt % YbAG ($Yb_3Al_5O_{12}$), 0.1 wt % to 20 wt % $Al_2O_3$, and 0.1 wt % to 20 wt % $TiO_2$, or any combination of two or more thereof.

15. The method of either claim 11 or 12, wherein the organic processing aid for any layer comprises:

a dispersant selected from polyethyleneimine (PEI), polyacrylic acid (PAA), ammonium polyacrylate, or a combination thereof and a binder selected from polyvinylbutyral (PVB) and polyvinylpyrollidone (PVP).

16. The method of claim 12, wherein application of any of the layers is done by dipping, spinning, spin-dipping, painting, or spraying.

17. The method of claim 12 wherein the bond coat layer and the top coat layer are further processed by drying, binder burn-out, and sintering.

18. The method of claim 12, wherein the second solvent for any layer is an alcohol selected from ethanol, methanol, ethyl alcohol, or a combination thereof.

* * * * *